(12) United States Patent  (10) Patent No.: US 6,736,461 B2
Blair et al.  (45) Date of Patent: May 18, 2004

(54) VEHICLE SEAT ASSEMBLY

(75) Inventors: David M. Blair, Troy, MI (US); Wojciech Smuk, Troy, MI (US); Mike Morrow, Detroit, MI (US); Jim Nickolopoulos, Attica, MI (US); Peter Traks, Waterford, MI (US)

(73) Assignee: Faurecia Automotive Seating Canada Limited, Mississauga (CA)

( * ) Notice: Subject to any disclaimer, the term of this patent is extended or adjusted under 35 U.S.C. 154(b) by 0 days.

(21) Appl. No.: 10/355,097

(22) Filed: Jan. 31, 2003

(65) Prior Publication Data

US 2003/0197410 A1 Oct. 23, 2003

Related U.S. Application Data

(60) Provisional application No. 60/373,313, filed on Apr. 18, 2002.

(51) Int. Cl.[7] .................................................. B60N 2/12
(52) U.S. Cl. .............................. 297/378.12; 297/378.1; 297/341
(58) Field of Search .......................... 297/378.12, 341, 297/378.1

(56) References Cited

U.S. PATENT DOCUMENTS

| | | | | |
|---|---|---|---|---|
| 5,597,206 A | * | 1/1997 | Ainsworth et al. | .... 297/378.12 |
| 5,673,972 A | * | 10/1997 | Dudash et al. | ......... 297/378.12 |
| 5,779,313 A | | 7/1998 | Rohee | |
| 6,152,533 A | * | 11/2000 | Smuk | ................. 297/378.12 X |
| 6,290,297 B1 | * | 9/2001 | Yu | ......................... 297/378.12 |
| 6,312,053 B1 | | 11/2001 | Magyar | |
| 6,336,679 B1 | | 1/2002 | Smuk | |
| 6,513,875 B1 | * | 2/2003 | Gray et al. | ............. 297/378.12 |

* cited by examiner

Primary Examiner—Anthony D. Barfield
(74) Attorney, Agent, or Firm—Patrick J. Hofbauer

(57) ABSTRACT

The seat has a rotary recliner providing for selective pivotal movement of the seat back about an axis between occupiable and frontmost positions, and a dumped position therebetween. The improvement comprises a handle mounted on the back for movement between design and tipping positions, and an intermediate position therebetween; a member mounted on the back for pivotal movement therewith and for relative movement between first and second positions; a ring having a portion for, when the member is at its second position and the back is at its dumped position, engaging the member to arrest frontward pivotal movement thereof; and a first linkage for moving the member between its first and second positions upon movement of the handle between its design and intermediate positions and for controlling the recliner to permit said pivotal movement of the back when the handle is at its tipping position.

19 Claims, 18 Drawing Sheets

VEHICLE SEAT ASSEMBLY

FIELD OF THE INVENTION

This application claims the benefit of U.S. Provisional Application No. 60/373,313, filed Apr. 18, 2002.

The present invention relates to hinge mechanisms for vehicle seat assemblies, and more particularly, to a hinge mechanism which can be deployed to provide a vehicle seat assembly having, inter alia, reclining, dumping and fold-flat functionality.

BACKGROUND OF THE INVENTION

Passenger vehicles are known which have vehicle seat assemblies provided with reclining and fold-flat functionality, whereby the seat back may be selectively reclined about a pivot axis through a range of substantially upright, occupiable positions, for selection by the user of a preferred seating position, and also may be pivoted frontwardly to a "fold-flat" position, whereat the seat back substantially overlies the seat cushion in a generally horizontal orientation. In the case of, for example, a front row passenger seat in a 2+2 coupe, a minivan or the like, placing the seat back at its fold-flat position facilitates carriage of large or lengthy objects, such as skis or lumber, inside the vehicle.

It is known for seat assemblies to be also provided with dumping functionality whereby the seat back may be, by manipulation of a lever or the like, tilted frontwardly about said pivot axis to a so-called "dumped position" whereat it projects over the seat cushion to facilitate ingress and egress to and from the interior space in the vehicle to the rear of the seat assembly, for example, to allow occupant access to a rear row seat, in the case of a 2+2 coupe, or a third row seat, in the case of a minivan.

Rotary recliners are commonly utilized in hinge mechanisms to provide such reclining and fold-flat functionality, since they have their working components substantially enclosed (which lends reliability and safety), are relatively lightweight, quiet in use, fit into a relatively small design envelope and are known to be capable of relatively inexpensive manufacture. Exemplary rotary recliners are disclosed in U.S. Pat. No. 5,779,313 (Rohee), issued Jul. 14, 1998 and U.S. Pat. No. 6,336,679 (Smuk et al.), issued Jan. 8, 2002, which patents are incorporated herein by reference.

Attempts have also been made in the prior art to utilize rotary recliners to attain dumping functionality. For example, in U.S. Pat. No. 6,312,053 (Magyar), issued Nov. 6, 2001, there is disclosed a seat assembly including a rotary recliner which provides for the seat back to be rapidly pivoted frontwardly by turning a recliner knob. However, this assembly suffers in that the recliner knob is inconveniently positioned adjacent the base of the seat assembly, and further suffers in that, in a rapid tilt operation, the seat back travels pivotally frontwardly until it meets the seat cushion, which may be inconvenient if, for example, the functionality was inadvertently triggered while fragile goods were positioned on the seat cushion.

Other mechanisms are known to provide such reclining, fold-flat and dumping functionality, but utilize a separate load bearing lock or latch for each function, actuated by independent actuation mechanisms, adding complexity and cost. Another problem with this "latch upon latch" approach of the prior art is that it multiplies the number of issues related to strength, durability, reliability, release effort and noise. Lastly, the "latch upon latch" approach results in tolerance stacking problems, which, in turn, raises rattling, jamming and other quality control concerns.

All of these issues are of serious concern to present-day vehicle manufacturers, who demand continually higher quality content at increasingly lower prices.

Accordingly, it is an object of the present invention to provide an improved vehicle seat assembly having, inter alia, reclining, dumping and fold-flat functionality that is relatively reliable, safe, lightweight, quiet in use, small and inexpensive to manufacture and that does not utilize separate load bearing locks or latches for each of the foregoing functions.

SUMMARY OF THE INVENTION

In accordance with one aspect of the present invention there is disclosed an improved vehicle seat assembly for use in a vehicle of the type having a front end, a rear end, a longitudinal axis extending between the front end and the rear end, a lateral axis arranged transverse to the longitudinal axis and a floor.

The vehicle seat assembly is of the type having a seat including a seat cushion, a seat back and a rotary recliner. The seat cushion has a seat cushion mounting bracket, and, in use, is operatively mounted on said floor. The seat back has a seat back mounting bracket. The rotary recliner comprises a first portion and second portion. The first portion is securely attached to said seat cushion mounting bracket and defines a pivot axis, said pivot axis, in use, extending in a substantially lateral manner and being disposed adjacent the rear end of the seat cushion. The second portion is mounted to the first portion for selective relative pivotal movement about said pivot axis and has the seat back mounting bracket securely attached thereto so as to provide, in use, for selective pivotal movement of the seat back with respect to the seat cushion about said pivot axis within a first range of angular positions.

The first range of angular positions includes a second range of positions whereat the seat is occupiable, said second range including a design position of the seat back. The first range further includes a dumped position relatively frontwardly pivotally displaced from the second range and a frontmost position, relatively frontwardly pivotally displaced from the dumped position.

The improvement comprises a tip activation handle, a control member, mounting means, first linkage means and abutment means.

The tip activation handle is mounted on the seat back for movement between a design position, a tipping position and an intermediate position therebetween.

The mounting means is for mounting the control member on the seat back for pivotal movement therewith about the pivot axis and for movement relative thereto between a first position and a second position.

The abutment means is for selectively, when the control member is at its second position and the seat back is at its dumped position, engaging the control member to arrest frontward pivotal movement of the control member, thereby to arrest frontward pivotal movement of the seat back about the pivot axis at the dumped position thereof when the control member is at its second position.

The first linkage means is for selectively effecting movement of the control member between its first position and its second position upon movement of the tip activation handle between its design position and its intermediate position and for controlling the rotary recliner to permit said relative pivotal movement of the first portion and the second portion upon movement of the tip activation handle to its tipping position.

This provides, when the seat back is within the second range and upon manual manipulation of the tip activation handle from its design position to its tipping position, for said first linkage means to control said rotary recliner to permit said relative pivotal movement of the first portion and the second portion only after the control member has reached its second position, so as to ensure that frontward pivotal movement of the seat back about the pivot axis beyond the dumped position thereof is arrested by the abutment means.

As another aspect, the invention also comprises a hinge mechanism for use in a seat assembly for a vehicle of the type having a front end, a rear end, a longitudinal axis extending between the front end and the rear end, a lateral axis arranged transverse to the longitudinal axis and a floor.

The hinge mechanism is of the type having a seat cushion mounting bracket, a seat back mounting bracket, a rotary recliner and a control shaft.

The seat cushion mounting bracket, in use, forms part of a vehicle seat cushion and is operatively mounted on said floor.

The seat back mounting bracket, in use, forms part of a vehicle seat back.

The rotary recliner comprises a first portion and a second portion.

The first portion is securely attached to said seat cushion mounting bracket and defines a pivot axis, said pivot axis, in use, extending in a substantially lateral manner and being disposed adjacent the rear end of said seat cushion.

The second portion is mounted to the first portion for selective relative pivotal movement about said pivot axis and has the seat back mounting bracket securely attached thereto so as to provide, in use, for selective pivotal movement of said seat back with respect to the seat cushion about said pivot axis within a first range of angular positions.

The first range of angular positions includes a second range of positions, whereat said seat back and said seat cushion form an occupiable seat, said second range including a design position of said seat back.

The first range further includes a dumped position relatively frontwardly pivotally displaced from the second range and a frontmost position, relatively frontwardly pivotally displaced from the dumped position.

The control shaft is mounted to the rotary recliner for pivotal movement about the pivot axis between a disengaged position and an engaged position, the control shaft being biased for movement towards its engaged position and operably coupled to the rotary recliner such that said relative pivotal movement of the first portion and the second portion is permitted when the control shaft is at its disengaged position and is arrested when the control shaft is at its engaged position.

The improvement comprises a tip activation handle, a control member, mounting means, abutment means and first linkage means.

The tip activation handle is mountable on said seat back for movement between a design position, a tipping position and an intermediate position therebetween.

The mounting means is for mounting the control member on the seat back mounting bracket for pivotal movement therewith about the pivot axis in use and for movement relative thereto between a first position and a second position, preferably, for constrained substantially radial relative movement between said first position and said second position, and preferably comprises a radial slot and a link member.

The radial slot is formed through the seat back mounting bracket and defines a translation axis.

The link member has a first end mounted to the seat back mounting bracket by a pin and socket mechanism and a second end mounted within said radial slot for translational movement along said translation axis between limit positions defined by the ends of said radial slot. The second end of said link member is connected to said control member to drive the control member between its first position and its second position upon movement of the second end of the link member between its limit positions.

The abutment means is for selectively, when the control member is at its second position and said seat back is at its dumped position, engaging the control member to arrest frontward pivotal movement of the control member about the pivot axis, thereby to arrest frontward pivotal movement of the seat back about the pivot axis at the dumped position thereof when the control member is at its second position.

The first linkage means is for selectively effecting movement of the control member between its first position and its second position upon movement of the tip activation handle between its design position and its intermediate position and for controlling the rotary recliner to permit said relative pivotal movement of the first portion and the second portion upon movement of the tip activation handle to its tipping position.

The first linkage means preferably comprises a first spring, a crank and a first Bowden cable.

The first spring is operably connected between the seat back mounting bracket and the link member for biasing the control member for movement towards its first position.

The crank rigidly extends from the control shaft, in a radial direction substantially transverse to said translation axis, to a free end.

The first Bowden cable, in use, has the opposed ends of its inner wire operably connected to the tip activation handle and to the free end of the crank and the opposed ends of its sheath operably connected to said seat back and to the link member such that, when the tip activation handle is at its design position with the control member at its first position and the control shaft at its engaged position, movement of the tip activation handle from its design position to its intermediate position causes movement of the control member to its second position and such that, when the control member is at its second position with the control shaft at its engaged position and the tip activation handle at its intermediate position, movement of the tip actuation handle to its tipping position causes rotation of the control shaft to its disengaged position.

This provides, when the seat back is within the second range and upon manual manipulation of the tip activation handle from its design position to its tipping position, for said first linkage means to control said rotary recliner to permit said relative pivotal movement of the first portion and the second portion only after the control member has reached its second position, so as to ensure that frontward pivotal movement of said seat back about the pivot axis beyond the dumped position is arrested by the abutment means.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinafter.

BRIEF DESCRIPTION OF THE DRAWINGS

In the accompanying drawings, which should be understood to be for the purpose of illustration only, and are not intended as a definition of the limits of the invention.

DETAILED DESCRIPTION OF A PREFERRED EMBODIMENT

Figure 1:
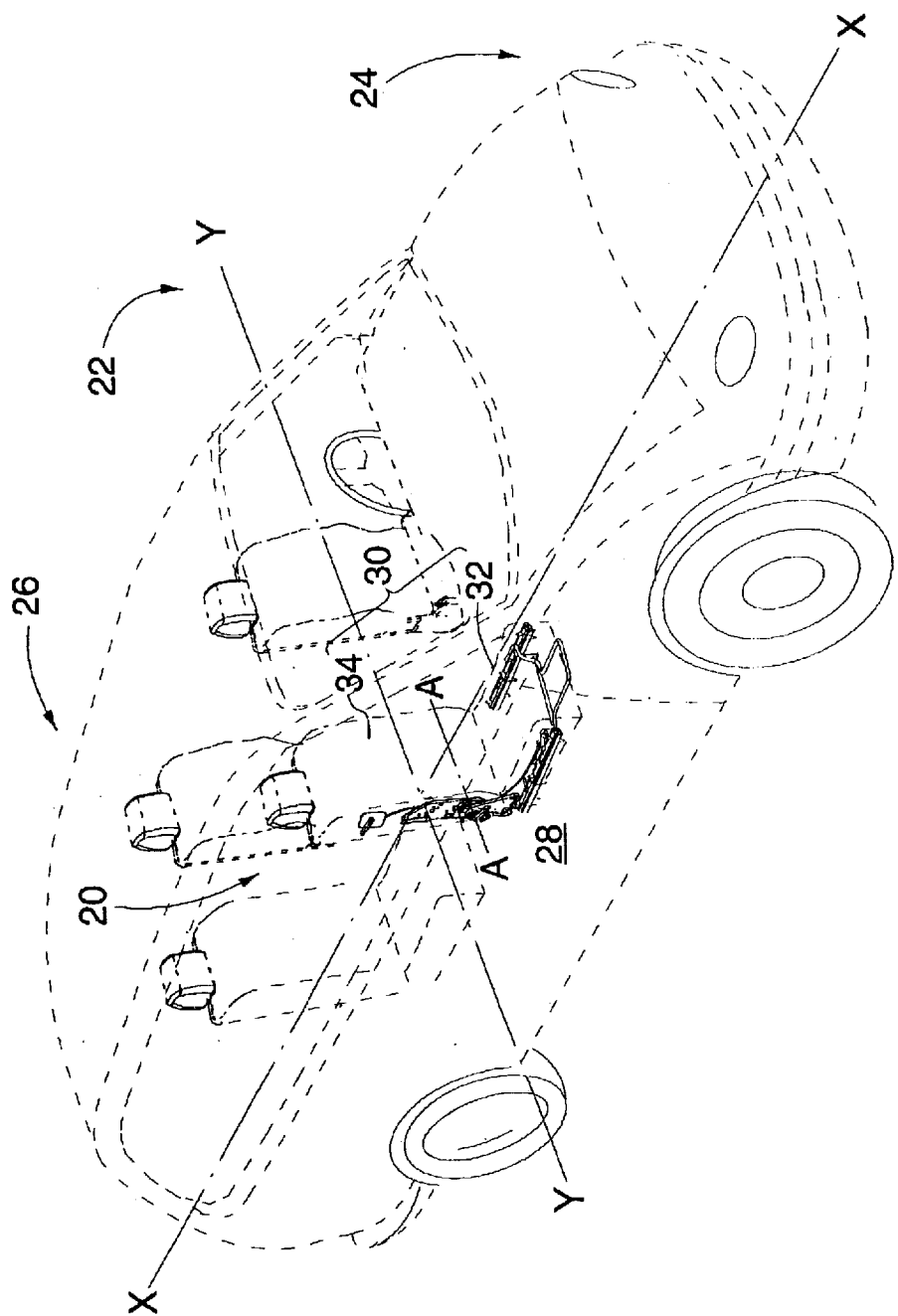
FIG. 1 is a front, top, right side perspective view of a seat assembly according to a preferred embodiment of the present invention in use in a vehicle, with a seat of the seat assembly having its seat back disposed at a design position, whereat the seat is occupiable. For clarity, only those elements of the structure that will be hereinafter described in detail are shown in blackline, with all other elements shown in phantom.

FIG. 1 illustrates a seat assembly, designated with general reference numeral 20, according to a preferred embodiment of the present invention in use in a vehicle 22 (illustrated in phantom outline). For greater certainty, the vehicle 22, which is of the type having a front end 24, a rear end 26, a longitudinal axis X—X extending between the front end 24 and the rear end 26, a lateral axis Y—Y arranged substantially transverse to the longitudinal axis X—X and a floor 28, does not form part of the invention.

Figure 2:
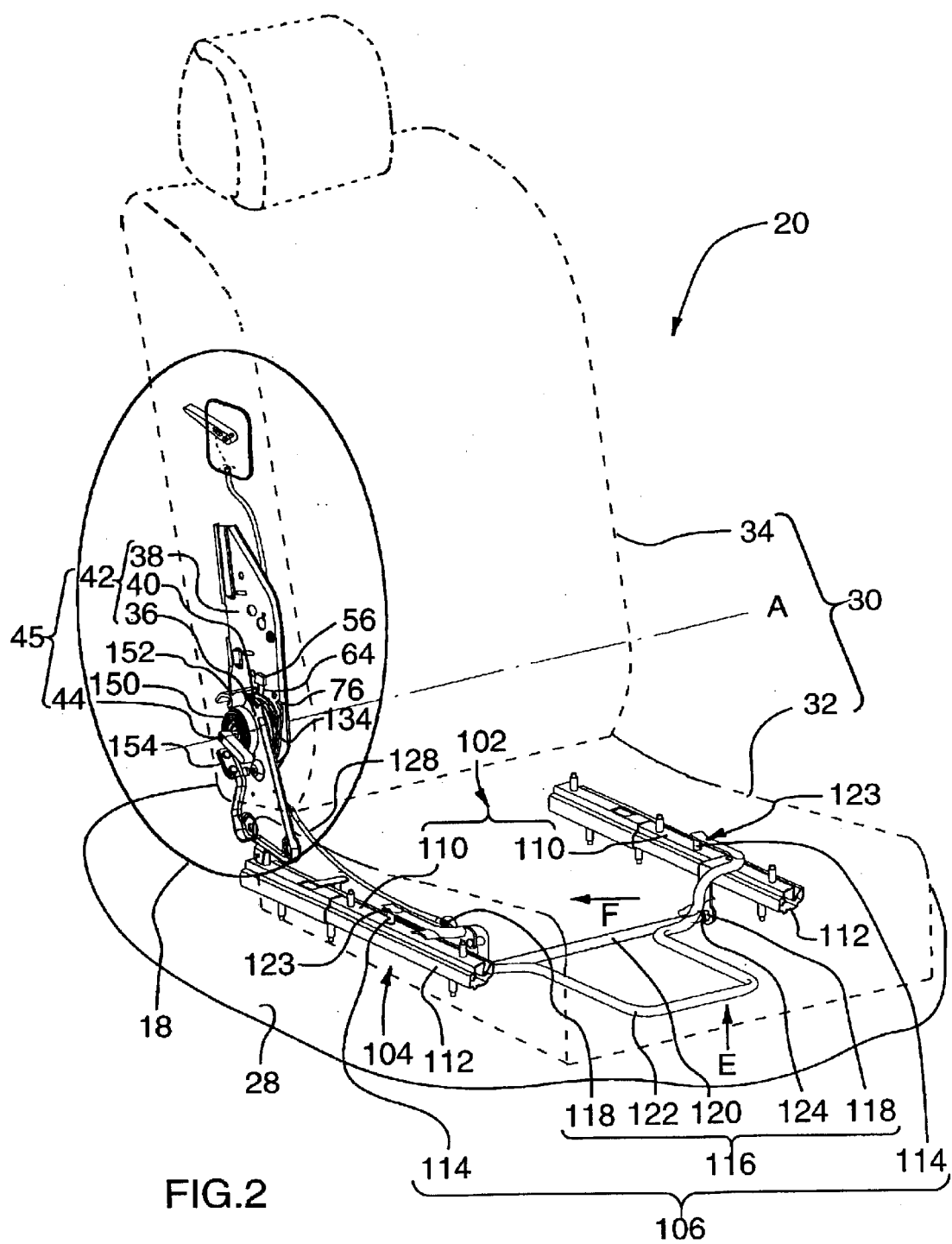
FIG. 2 is an enlarged perspective view of the seat assembly of FIG. 1.

The seat assembly 20, as best seen in FIG. 2, is of the type having a seat 30 including a seat cushion 32 and a seat back 34. For clarity, only selected working components of the seat assembly 20, described below, are illustrated in blackline, but the seat cushion 32 and the seat back 34 should be understood to include suitable support skeletons, as well as padded portions, of foam or the like, and a covering of fabric, plastic or leather.

The working components of the seat assembly 20 conventionally include: a seat cushion mounting bracket 36, which forms part of seat cushion 32; a seat back mounting bracket 38, which forms part of seat back 34; and a rotary recliner 40, which together form a hinge 42. The working components also, as is conventional, include a control shaft 44 operably coupled to the rotary recliner 40 in a manner discussed more fully below. The hinge 42 and the control shaft 44 together form a selectively operable hinge mechanism 45.

A specific form of rotary recliner 40 with control shaft 44, as shown and suitable for this application, is available from Faurecia Automotive Seating, Inc., of Troy, Mich., as Discontinuous Round Recliner Part No. 499202, for right-handed applications, or Part No. 4999203, for left-handed applications.

Figure 11:
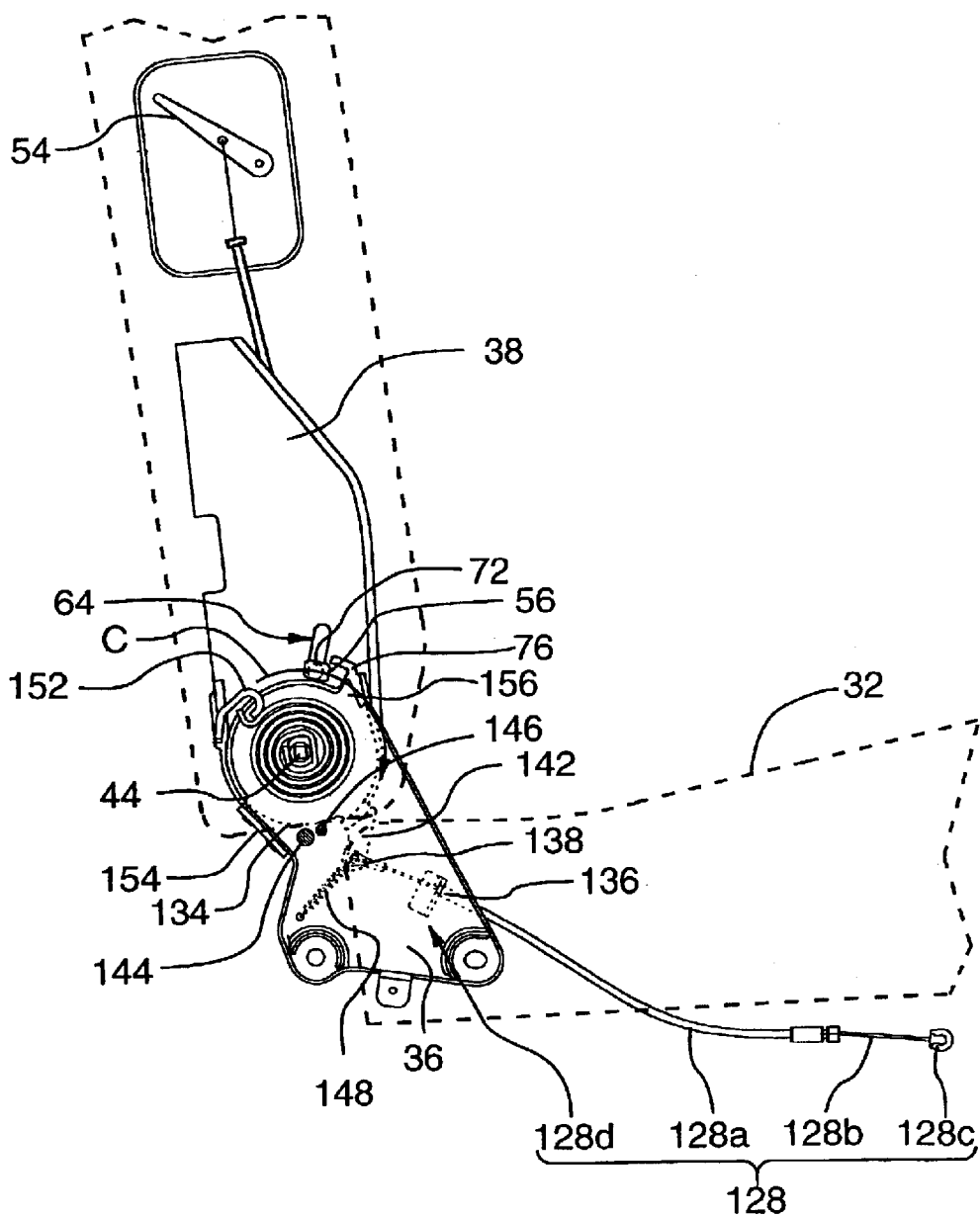
FIG. 11 is a view similar to FIG. 10, with the tip activation handle disposed at an intermediate position thereof.
Figure 12:
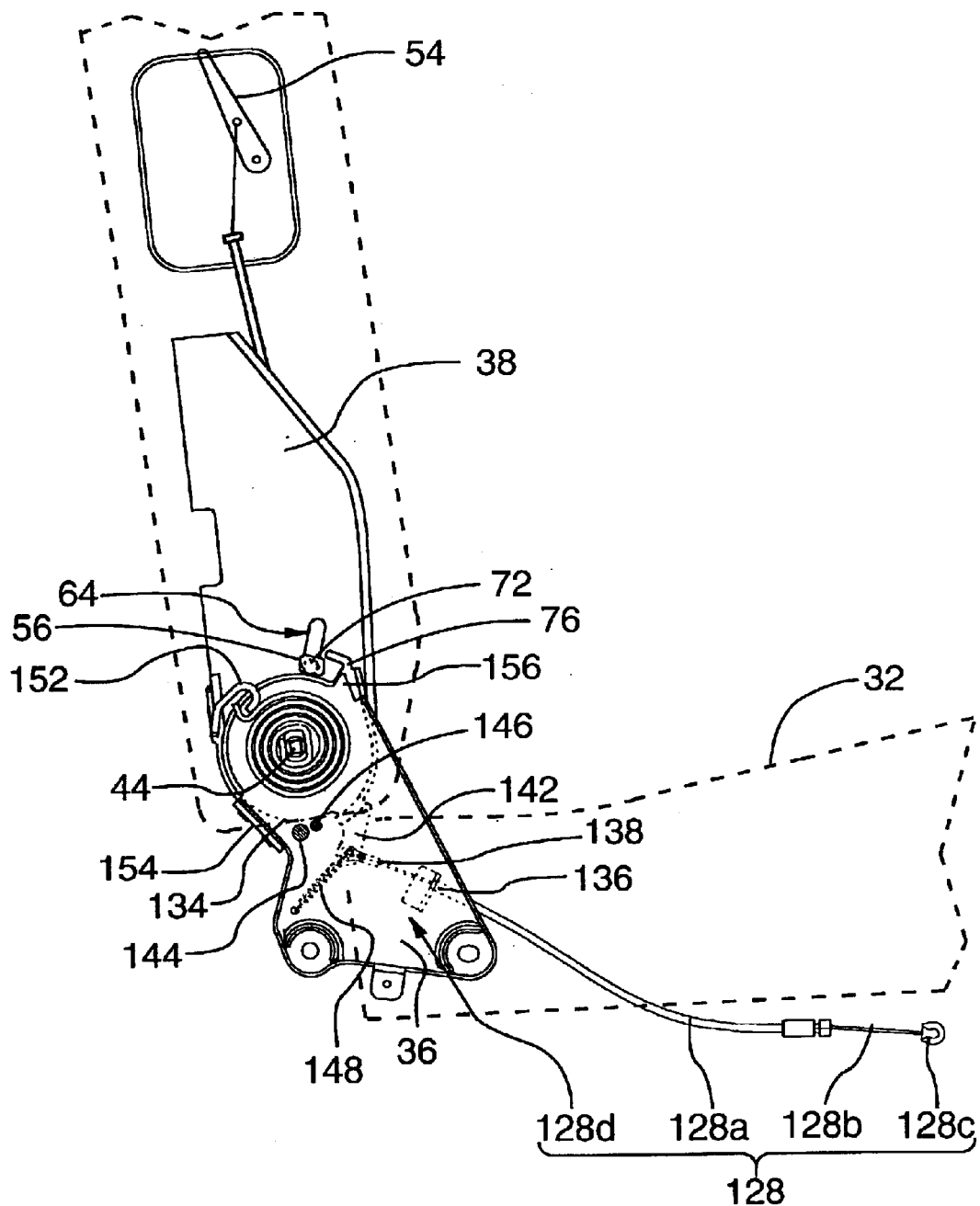
FIG. 12 is a view similar to FIG. 11, with the tip activation handle disposed at a tipping position thereof.
Figure 18:
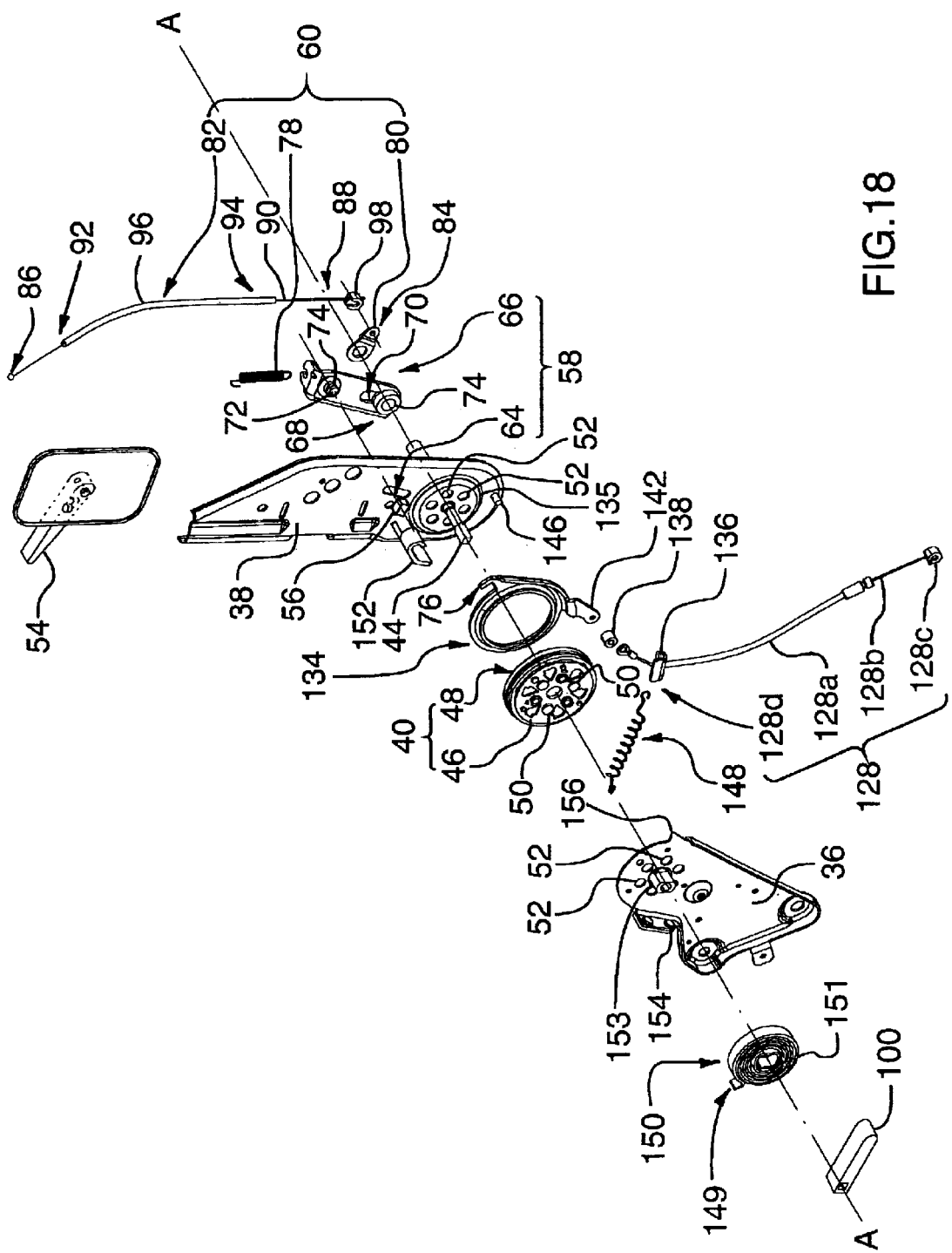
FIG. 18 is an exploded perspective view of the encircled area 18 of FIG. 2.

As best indicated in FIG. 18, in this structure, the control shaft 44 is mounted to the rotary recliner 40 for pivotal movement about a pivot axis A—A between a disengaged position and an engaged position, illustrated in FIGS. 12 and 11, respectively. The rotary recliner 40, in turn, includes a first portion 46 and a second portion 48 which are mounted to one another for relative rotation, also about pivot axis A—A, and also includes internal components (not shown) which bias the control shaft 44 for movement towards its engaged position, and which are manipulated thereby, upon movement of control shaft 44 between its engaged position and its disengaged position, between a locked configuration, wherein said relative pivotal movement of the first portion 46 and the second portion 48 is arrested, and an unlocked configuration, wherein said relative pivotal movement of the first portion 46 and the second portion 48 is permitted. Such rotary recliners of off-the-shelf items, available as aforesaid, and the details of construction of the internal components thereof are well known to persons of ordinary skill in the art, and as such, are not described herein in detail.

In the preferred embodiment illustrated, the first portion 46 of the rotary recliner 40 is securely attached to the seat cushion mounting bracket 36 and defines the pivot axis A—A, which, as illustrated in FIG. 1, in use, extends in a substantially lateral manner and is disposed adjacent the rear end of the seat cushion 32. As best indicated in FIG. 18, such secure attachment of the first portion 46 to the seat cushion mounting bracket 36 is effected in the preferred embodiment illustrated through the combination of locating studs 50, which project from the first portion 46 through corresponding holes 52 formed in the seat cushion mounting bracket 36, to provide primary mechanical support, in combination with spot welding, which ensures that the structures 46,36 do not separate from one another.

Figure 4:
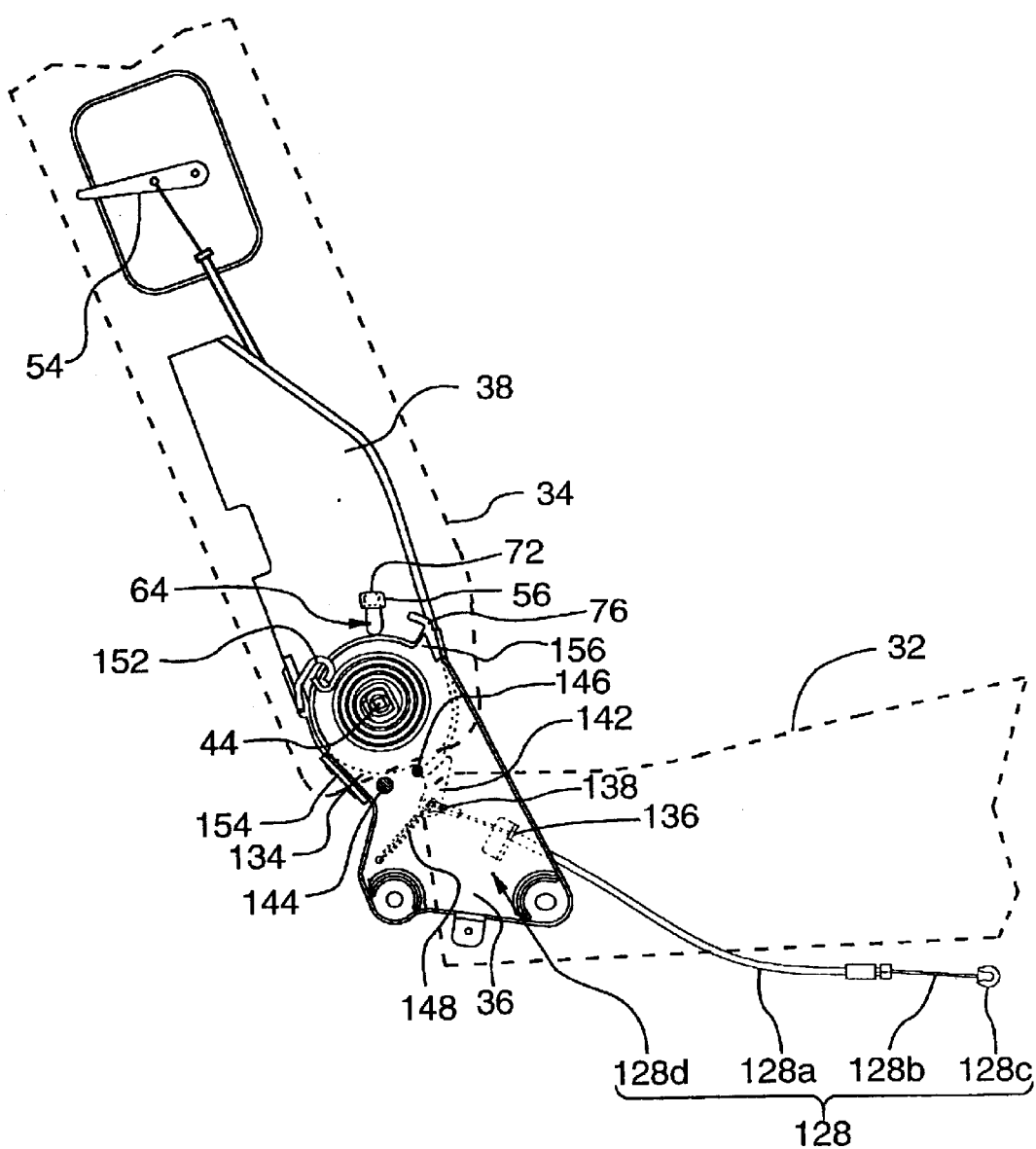
FIG. 4 is a right side elevational view of a portion of the seat assembly of FIG. 1, with the seat back disposed at a design position thereof.

The second portion 48 which, as is conventional, has the first portion 46 mounted thereto for selective relative pivotal movement about said pivot axis A—A as aforementioned, has the seat back mounting bracket 38 securely attached thereto so as to provide, in use, for selective pivotal movement of the seat back 34 with respect to the seat cushion 32 about pivot axis A—A within a first range of angular positions. The first range of angular positions includes: a second range of positions, shown representatively by FIGS. 5–7, whereat the seat 30 is occupiable, and which second range includes a design position, shown in FIGS. 2 and 4; a dumped position, shown in FIG. 14, relatively frontwardly pivotally displaced from the second range, whereat the seat back 34 projects in vertically angled relation over the seat cushion 32; a frontmost position, illustrated in FIG. 9, relatively frontwardly pivotally displaced from the dumped position, whereat the seat back 34 substantially overlies the seat cushion 32 in a generally horizontal orientation; a first transition position, illustrated in FIG. 13, relatively frontwardly pivotally displaced from the second range of occupiable positions; and a second transition position, illustrated in FIG. 7, relatively rearwardly pivotally displaced from the first transition position.

Again, a combination of spot welding, locating studs (not shown on the second portion 48) and corresponding holes 52 are utilized in the preferred embodiment to provide for such secure attachment of the seat back mounting bracket 38 to the second portion 48 of the rotary recliner 40.

In the illustrations, the seat back 34 and the seat cushion 32 are shown to be connected to one another only through the hinge 42. However, although not shown, it should be understood that the preferred seat assembly 20 further comprises a laterally-spaced second hinge, the second hinge including a seat cushion mounting bracket and a seat back mounting bracket, coupled to one another by means of a conventional pivot bushing.

Figure 14:
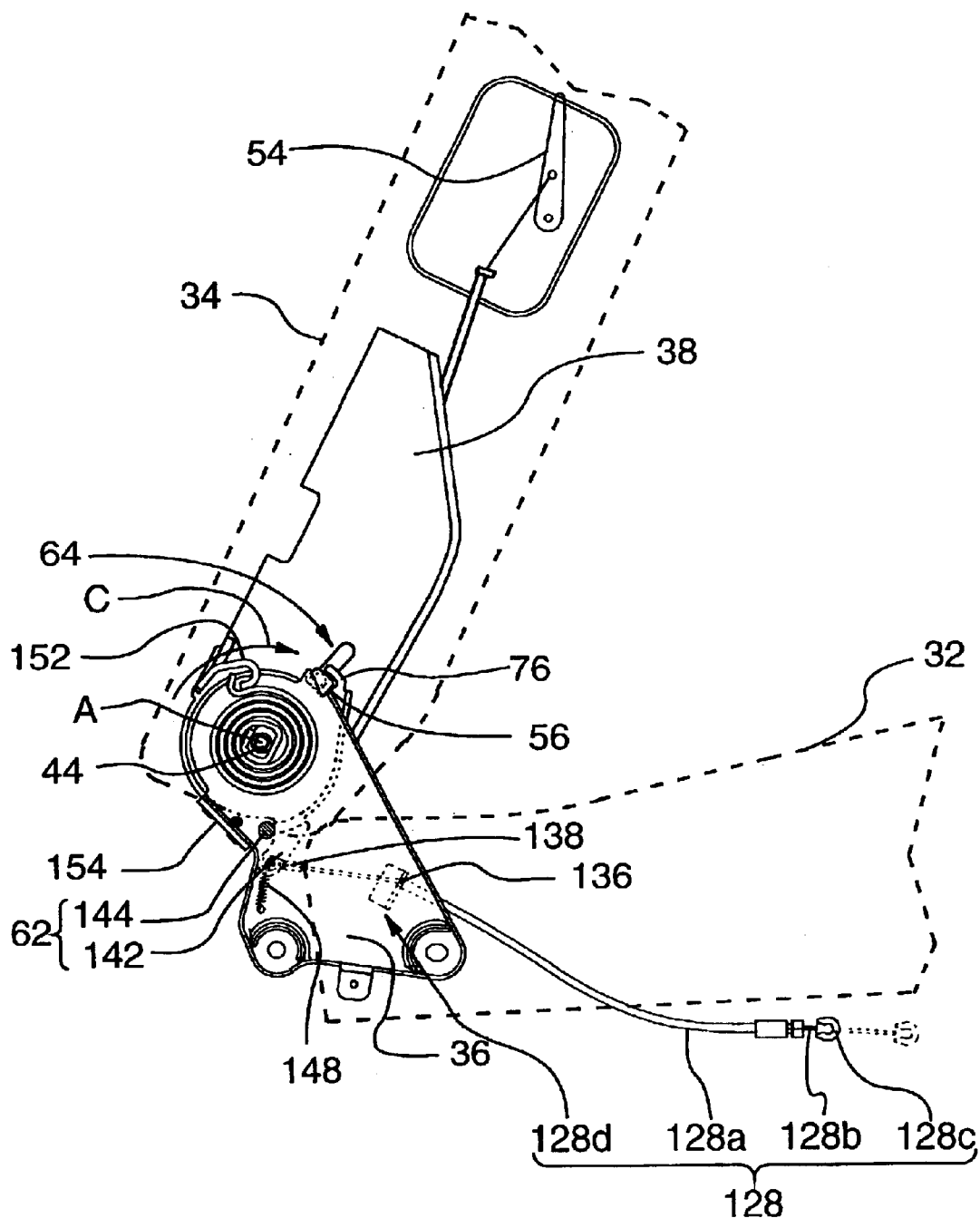
FIG. 14 is a view similar to FIG. 13, with the seat back disposed at a dumped position thereof.

The improvement of the present invention includes a tip activation handle 54, a control member 56, a mounting means 58 and a first linkage means 60, as shown in FIG. 18, and abutment means 62, as indicated in FIG. 14, all being described more fully hereinafter.

Figure 10:
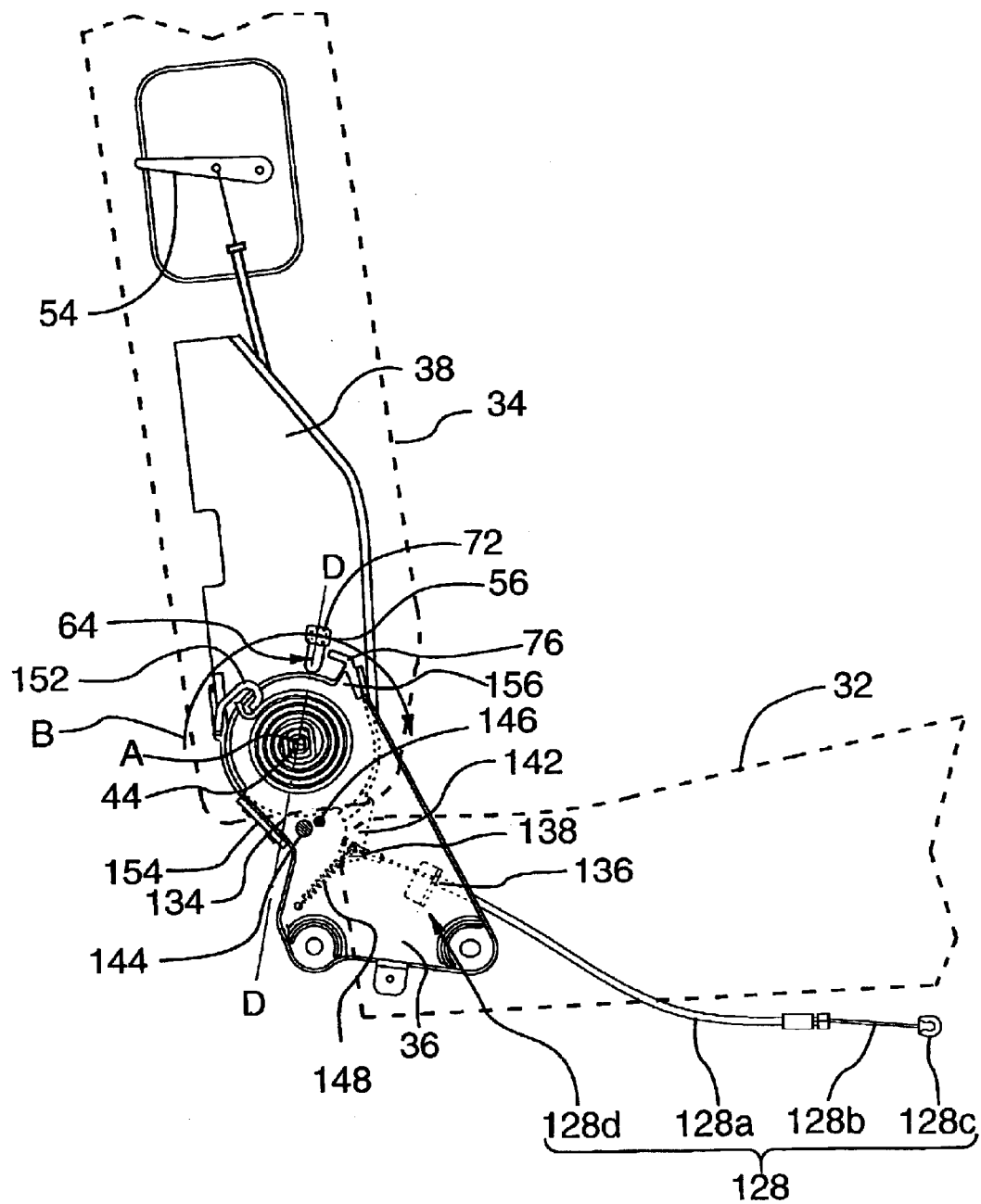
FIG. 10 is a view identical to FIG. 8, showing a tip activation handle of the seat assembly disposed at a design position thereof.

The tip activation handle 54 is pivotally mounted on the seat back 34 for movement between a design position, shown in FIG. 10, a tipping position, shown in FIG. 12, and an intermediate position therebetween, shown in FIG. 11. In the preferred embodiment, such pivotal mounting is effected by a bushing and pintle arrangement, or the like (not shown).

The preferred mounting means 58 is for mounting the control member 56 on the seat back 34 for pivotal movement therewith about the pivot axis A—A, as indicated by the sequence of FIGS. 5 through 9, and for constrained substantially radial relative movement thereto, between a first position, shown in FIG. 10, and a second position, shown in FIG. 11.

Thus, upon said pivotal movement of the seat back 34, the control member 56 will define, when in the first position, a first arcuate path relatively distal to the pivot axis A—A, and, when in the second position, a second arcuate path relatively proximal to the pivot axis A—A, as indicated by arrows "B" and "C", respectively, in FIG. 10 and in FIG. 11.

In the preferred embodiment illustrated, the mounting means 58 will be seen in FIG. 18 to comprise a slot 64 and a link member 66.

The slot 64 is formed through the seat back mounting bracket 38 and defines a translation axis D—D that extends radially, relative to the pivot axis A—A, as shown in FIG. 10.

As best viewed in FIG. 18, the link member 66 has a first end 68 mounted to the seat back mounting bracket 38 by a pin and socket 70 mechanism, with the control shaft 44 forming the pin thereof, and a second end 72, in the form of a guide pin, mounted within said radial slot 64 for translational movement along said translation axis D—D between limit positions defined by the ends of said slot 64, as indicated in FIG. 10 and FIG. 11, wherein the guide pin 72 is shown in phantom outline.

As best indicated in FIG. 18, spacers 74,74 constructed of a rigid self-lubricating material such as PTFE or the like, are provided adjacent each of the first end 68 and the second end 72 so as to provide for smoothness in operation, and the guide pin 72 is securely connected to the control member 56 to drive same between its first position and its second position upon movement of the second end 72 of the link member 66 between its limit positions.

The abutment means 62 is for selectively, when the control member 56 is at its second position and the seat back 34 is at its dumped position, as shown in FIG. 14, engaging the control member 56 to arrest frontward pivotal movement of the control member 56 about the pivot axis A—A, thereby to arrest frontward pivotal movement of the seat back 34 about the pivot axis A—A at its dumped position when the control member 56 is at its second position. The preferred abutment means 62 will be discussed in more detail in following paragraphs. At this time, it will only be noted that, with the seat back 34 and the control member 56 positioned as shown in FIG. 14, part 76, discussed in detail in following paragraphs, is positioned along the second arcuate path "C", immediately frontwardly relative to control member 56 and in abutting relation thereto, thereby to contain the control member 56 as against frontward pivotal movement about the pivot axis A—A.

The first linkage means 60 is for selectively effecting movement of the control member 56 between its first position and its second position upon movement of tip activation handle 54 between its design position and its intermediate position, and is also for controlling the rotary recliner 40 to permit said relative pivotal movement of the first portion 46 and the second portion 48 upon movement of the tip activation handle 54 to its tipping position.

Figure 16:
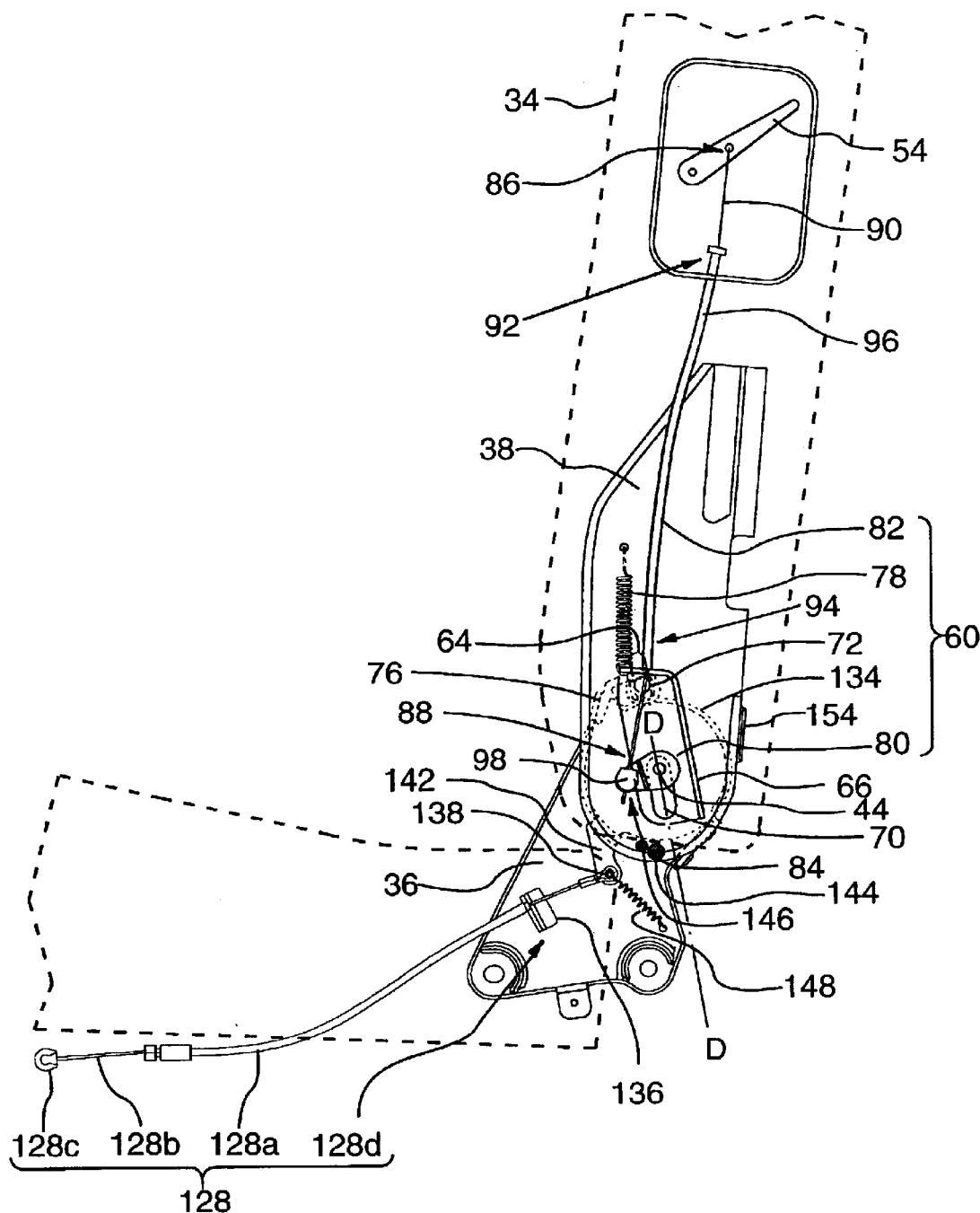
FIG. 16 is a view of the structure of FIG. 11, viewed from the opposite side.

In the preferred embodiment illustrated, the first linkage means 60 comprises a first spring 78, a crank 80 and a first Bowden cable 82, illustrated, inter alia, in FIG. 16.

The first spring 78 is operably connected between the seat back mounting bracket 38 and the link member 66 for biasing the control member 56 for movement towards its first position.

The crank 80 extends from the control shaft 44, in a radial direction substantially transverse to said translation axis D—D, to a free end 84, and is rigidly connected to the control shaft 44, by staking or the like.

The first Bowden cable 82 has the opposed ends 86,88 of its inner wire 90 connected to the tip activation handle 54 and to the free end 84 of the crank 80 and the opposed ends 92,94 of its outer sheath 96 connected to the seat back 34 and the link member 66, the connection between the inner wire 90 and crank 80 being by way of a first cable connector 98 rotatably mounted to crank 80.

This provides, when the tip activation handle 54 is at its design position with the control member 56 at its first position and the control shaft 44 at its engaged position, as shown in FIG. 10, for movement of the tip activation handle 54 from its design position to its intermediate position to cause movement of the control member 56 to its second position, as shown in FIG. 11.

This further provides, when the control member 56 is at its second position with the control shaft 44 at its engaged position and with the tip activation handle 54 at its intermediate position, as shown in FIG. 11, for movement of the tip actuation handle 54 to its tipping position to cause rotation of the control shaft 44 to its disengaged position, as shown in FIG. 12.

For greater clarity in regard to the foregoing, it will be understood that manipulation of the tip activation handle 54 from its design position to its tipping position causes the inner wire 90 of the first Bowden cable 82 to be drawn radially outwardly, thereby shortening the distance between end 88 of the inner wire and end 94 of the outer sheath 96.

Figure 15:
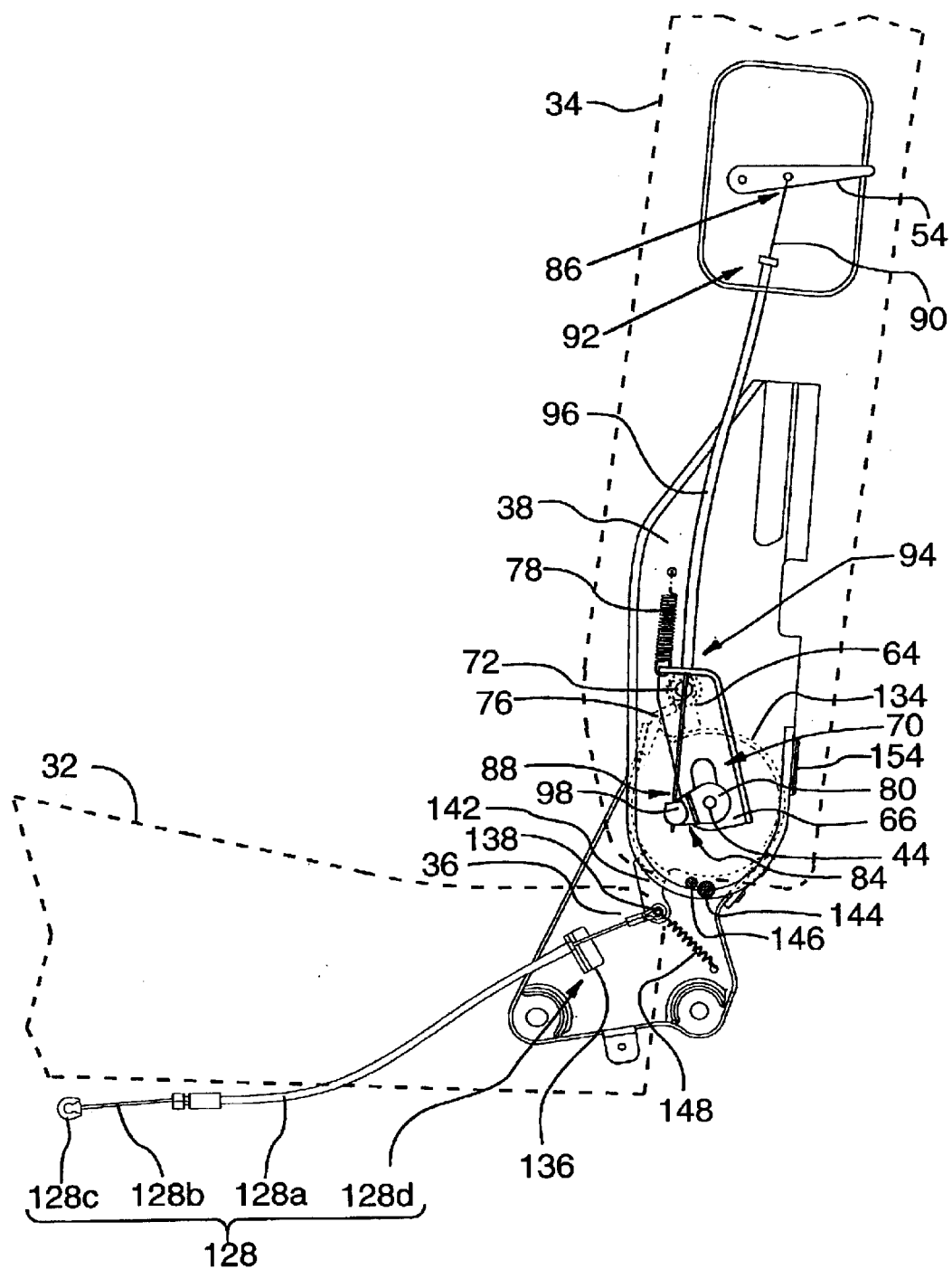
FIG. 15 is a view of the structure of FIG. 10, viewed from the opposite side.
Figure 17:
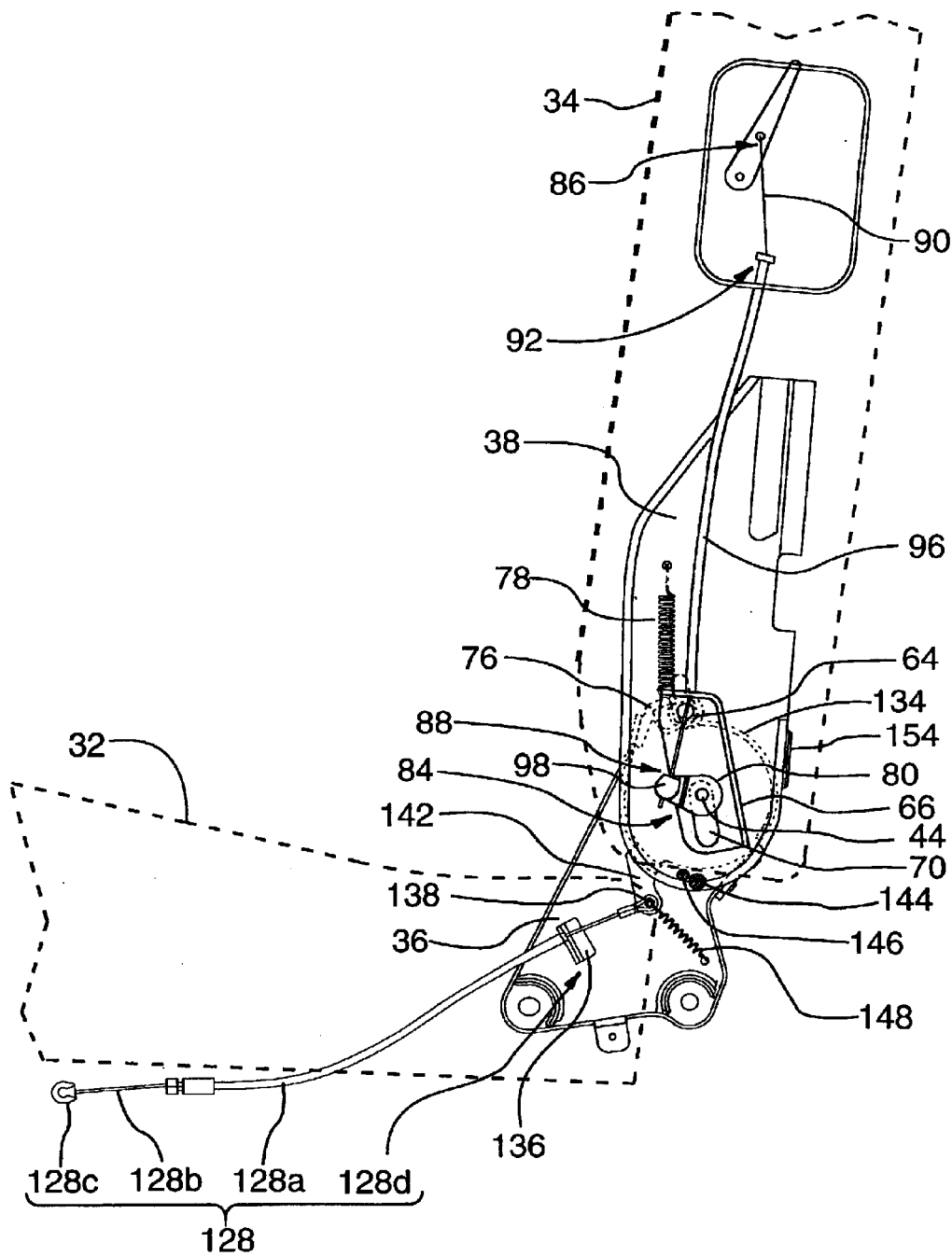
FIG. 17 is a view of the structure of FIG. 12, viewed from the opposite side.

Given that end 88 of the inner wire 90 is rigidly attached to free end 84 of the crank 80, and that end 94 of the sheath 96 is rigidly attached to the link member 66, such shortening must be accommodated by relative movement of the link member 66 and the crank 80. In the first instance, the internal components of rotary recliner 40 bias the control shaft 44 (and the crank 80 which is attached thereto) against movement away from the disengaged position, with the result that said shortening is accommodated entirely by movement of the link member 66, as permitted by the clearance provided in the pin 44 and socket 70 mechanism, so as to bring the control member 56 to its second position, as shown by the sequence of FIGS. 15,16. However, once such clearance is exhausted (that is, once pin 44 has traversed between its limit positions in the socket 70), such shortening can only be accommodated through pivotal movement of the crank 80, thereby to effect movement of control shaft 44 to its disengaged position, as illustrated by the sequence of FIGS. 16,17. Of course, it will be readily appreciated by persons of ordinary skill in the art that, in the preferred embodiment illustrated, the bias provided by the internal components of the rotary recliner 40 is selected to overcome the bias provided by the first spring 78, so as to provide for movement of link member 66 and crank 80 in the staged manner contemplated; the manner of such selection is within the ready understanding of persons of ordinary skill in the art, and as such, is not detailed herein.

It will also be evident that the foregoing combination has, in and of itself, substantial usefulness, in that it provides a seat assembly 20 which derives reclining, dumping and fold-flat functionality from a single load bearing locking mechanism, thereby to avoid the problems derived from "latch upon latch" devices. Moreover, as the single load bearing locking. mechanism takes the form of a rotary recliner, the seat assembly is relatively relatively reliable, safe, lightweight, quiet in use, small and inexpensive to manufacture as compared to devices of similar functionality of the prior art.

However, in the preferred embodiment, further features are additionally provided.

As one such feature, a recliner handle 100 is rigidly mounted to the control shaft 44 for manual manipulation of the control shaft 44 between its engaged position and its disengaged position, thereby to provide for said seat back 34 to be selectively lockable by an occupant by manipulation of said handle 100 at a desired position within said first range of angular positions. For clarity, the recliner handle 100 is shown only in FIG. 1 and FIG. 2.

Figure 3:
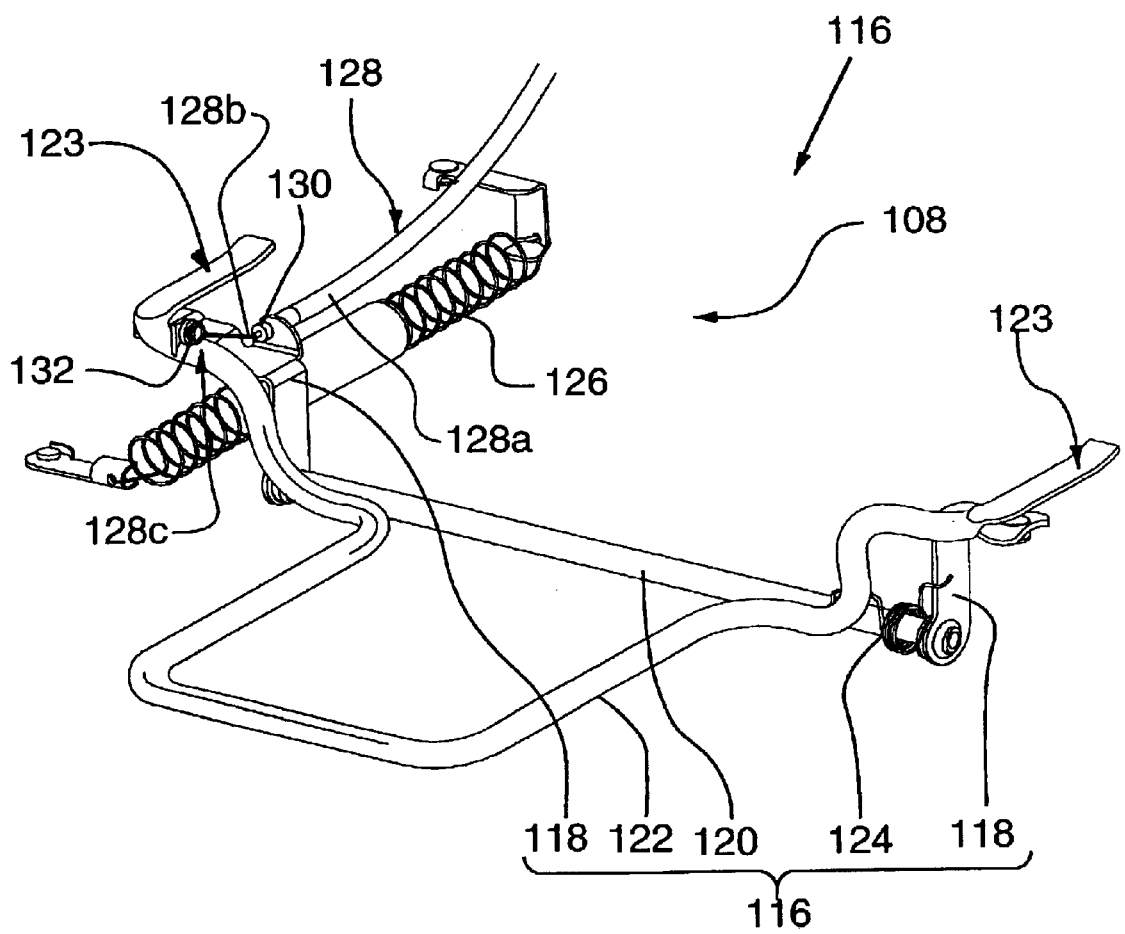
FIG. 3 is a partial view of the seat assembly of FIG. 1 in the direction of arrow "F" of FIG. 2.

As other such features, a seat carriage 102, carriage lock means 104, carriage lock actuator means 106 and carriage bias means 108, best indicated in FIGS. 2 and 3, are also provided.

The seat carriage 102 is operatively mounted on the floor 28 for relative longitudinal movement through a plurality of longitudinal positions, with the seat cushion 32 mounted on said seat carriage 102 for longitudinal movement therewith. In the preferred embodiment illustrated, the seat carriage 102 conventionally comprises a pair of upper track sections 110,110 which slide within respective lower track sections 112,112 in operatively confined relation, the latter being bolted, screwed, or otherwise affixed (not shown) to the vehicle floor 28.

The carriage lock means 104 is for selectively permitting said longitudinal movement of the seat carriage 102.

In the preferred embodiment illustrated, each upper track section 110, in combination with the respective lower track section 112 within which it is disposed, forms a cavity, and the carriage lock means 104 comprises, as is well-known in the art, a latch hook and internal latch components (neither shown) disposed within each cavity.

The latch hook is mounted to said each upper track section 110 for movement between a locked position, whereat the teeth of the latch hook engage one or more of a plurality of complimentary apertures (not shown) in the respective lower track section 112 to arrest movement of said each upper track section 110 relative to the respective lower track section 112, and an unlocked position, whereat the teeth of the latch hook are removed from said apertures, to permit said movement of said each upper track section 110 relative to the respective lower track section 112. The internal latch components bias the latch hooks for movement towards their engaged positions.

The carriage lock actuator means 106 is for controlling the carriage lock means 104, and in the preferred embodiment illustrated, comprise a pair of buttons 114,114 and a handlebar mechanism 116.

Each of the pair of buttons 114,114 protrudes upwardly through a respective upper track section 110; is movable between a raised and a lowered position; and is operably coupled to the latch hook mounted to said each upper track section 110 to urge same between its locked position and its unlocked position as aforedescribed upon movement of said each button 114 between its raised and its lowered position.

The handlebar mechanism 116 includes a pair of mounting brackets 118,118 securely attached to respective upper track sections 110,110; a crossbar 120 rigidly extending between the. mounting brackets 118,118; a handlebar 122 having projecting trigger portions 123,123; and a handlebar torsion spring 124.

The handlebar 122 is pivotally mounted to the crossbar 120 such that an occupant, by grasping the handlebar 122 and pulling same upwardly in the direction of arrow "E" of FIG. 2, can cause pivoting of said handlebar 122 with concurrent generally downward movement of triggers 123, 123 onto the buttons 114,114, thereby to depress buttons 114,114 against their normal upward biasing so as to cause the latch hooks to move to their unlocked positions (previously described), thereby permitting longitudinal adjustment of the seat 30. The handlebar spring 124 biases handlebar 122 in the opposite direction of arrow "E" such that, upon release of the handlebar 122, it returns to its original lowered position shown in FIG. 2, thereby permitting upwardly biased buttons 114,114 to return to their raised positions. A limit mechanism (not shown) is also provided to arrest movement of the handlebar 122 beyond its lowered position, so as to avoid, inter alia, the handlebar 122 dropping to a position beneath its lowered position shown in FIG. 2 (that is, moving from FIG. 2 in the direction opposite to arrow "E") whereat it might contact articles stowed beneath the seat 30 and thereby interfere with longitudinal movement of the seat 30.

The carriage bias means 108 is for urging the seat carriage 102 longitudinally frontwardly, and in the preferred embodiment illustrated comprises a pair of track springs 126 (only one shown) operably coupled to the floor 28 and the seat carriage 102.

The carriage lock means 104, seat carriage 102, carriage lock actuator means 106 and carriage bias means 108 are of conventional construction, well-known to persons of ordinary skill in the art, and as such, are not detailed further herein.

As yet another optional feature of the preferred embodiment illustrated, an actuator cable 128, in the form of a second Bowden cable, is provided. Actuator cable 128 is operably coupled to the handlebar 122, and can be drawn from a first position thereof, shown in FIG. 2 and FIG. 13, to a second position thereof, shown in FIG. 14, upon application thereto of at least a threshold tensile force, so as to cause said pivoting of the handlebar member 122 with concurrent generally downward movement of the triggers 123,123 onto the buttons 114,114. Thus, in the first position of the actuator cable 128, shown in FIG. 13, longitudinal movement of seat carriage 102 is arrested, and in the second position of actuator cable 128, shown in FIG. 14, longitudinal movement of the seat carriage 102 is permitted. As will be evident, in the preferred embodiment illustrated, the actuator cable 128 is operably coupled to the handlebar 122 by means of a cable receiving portion 130 (seen in FIG. 3) formed in a respective one of the pair of mounting brackets 118,118 and adapted to securely receive the outer sheath 128a of the actuator cable 128, and by means of a second cable connector 132 rotatably mounted to the handlebar 122 and adapted to receive the first end 128c of the inner wire 128b of the actuator cable 128.

Figure 13:
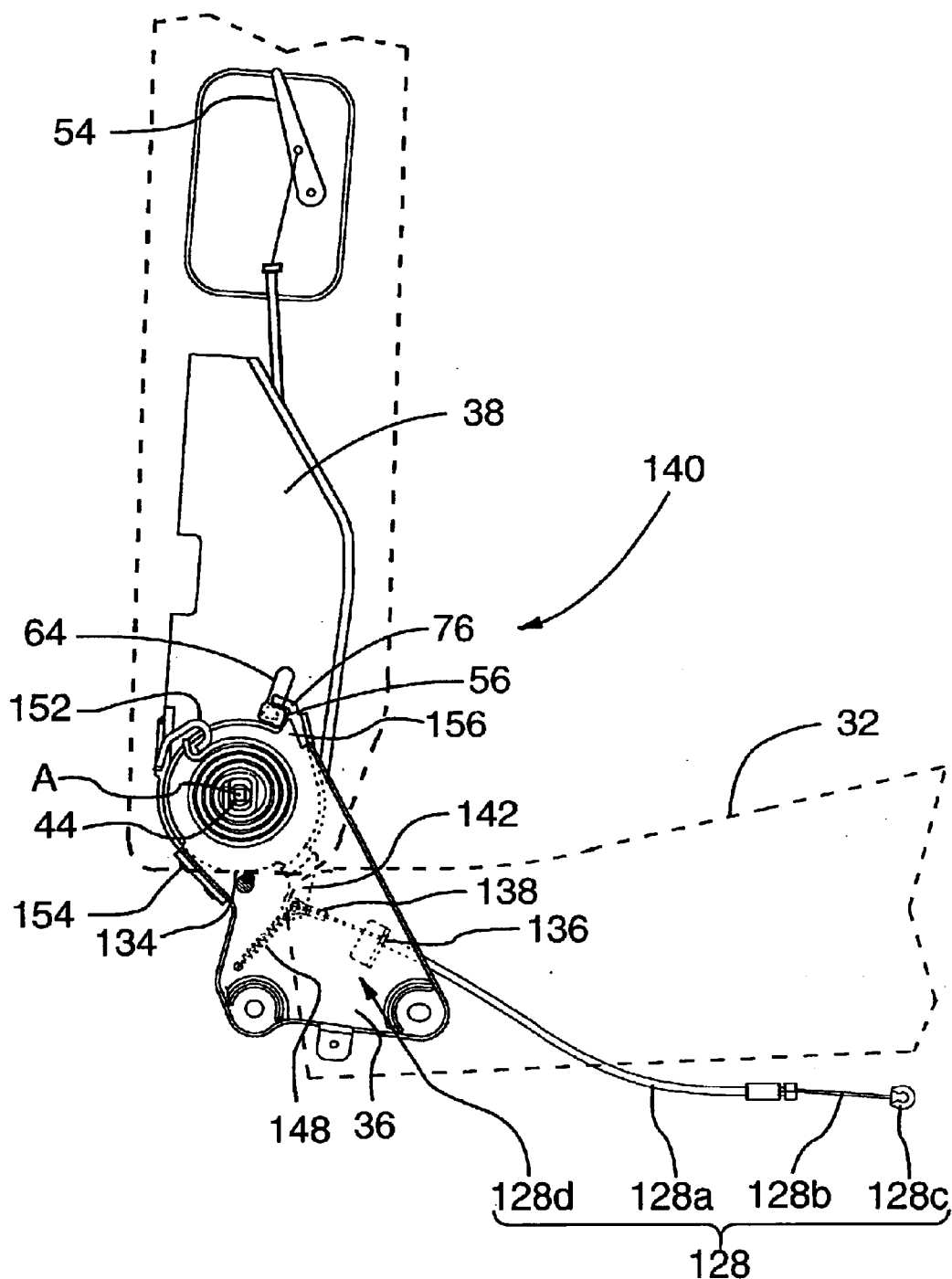
FIG. 13 is a view similar to FIG. 12, with the seat back disposed at a first transition position thereof, pivoted frontwardly slightly relative to its position in FIG. 12.

An idler ring 134 is also provided, and is mounted to the seat cushion mounting bracket 36 for relative pivotal movement, in use, about the pivot axis A—A between a design position shown in FIG. 13 and a frontwardly tilted position shown in FIG. 14, wherein the idler ring 134 is illustrated in phantom outline. In the preferred embodiment, such mounting is effected by providing, on the seat back mounting. bracket 38, a bearing surface 135 (best seen in FIG. 18), in the form of an annular shoulder, about which the idler ring 134 is journalled for rotation.

The idler ring 134 has the actuator cable 128 operably attached thereto such that, during said pivotal movement of idler ring 134 from its design position to its frontwardly tilted position, the actuator cable 128 is drawn from its first position to its second position, thereby to release the seat carriage 102. for longitudinal movement, as aforedescribed.

In the preferred embodiment illustrated, the actuator cable 128 is operably connected at its opposite other end 128d to the idler ring 134 by means of a notched cable connector 136 rigidly mounted to the seat cushion mounting bracket 36 and adapted to securely receive the outer sheath 128a of said actuator cable 128, and by means of a third cable connector 138 adapted to securely receive the inner wire 128b of said actuator cable 128 and rotatably mounted on the idler ring 134, as seen in FIG. 18.

As yet another feature of the preferred embodiment, a second linkage means 140, shown in FIG. 13, is provided, for drawing the actuator cable 128 from its first position to its second position, when the control member 56 is at its second position and upon frontward pivotal movement of the seat back 34 from its first transition position to its dumped position. This, of course, permits the seat 30 to slide frontwardly within the vehicle 22, through the agency of carriage bias means 108, after a dumping operation. Thus, the preferred seat assembly 20 also exhibits so-called "E-Z entry functionality", as is well known in the prior art and exemplified by, inter alia, U.S. Pat. No. 4,101,169 (Muraishi et al.), issued Jul. 18, 1978; U.S. Pat. No. 6,336,679 (Smuk), issued Jan. 8, 2002; and U.S. Pat. No. 5,597,206 (Ainsworth), issued Jan. 28, 1997, all of which patents are hereby incorporated by reference.

In the preferred embodiment illustrated, the second linkage means 140 comprises catchment portion 76 formed on said idler ring 134, as shown in FIG. 13. The catchment portion 76 is shaped and positioned such that, when the control member 56 is at its second position and upon pivotal movement of the seat back 34 from the first transition position thereof, shown in FIG. 13, to its dumped position, shown in FIG. 14, the control member 56 contacts the catchment portion 76 to drive the idler ring 134 from its design position to its frontwardly tilted position.

In this preferred embodiment wherein, as aforementioned, the idler ring 134 is driven to its frontwardly tilted position by the control member 56, through driving engagement with the catchment portion 76, the abutment means 62 comprises a protruding lug 142 formed on the idler ring 134 and a first stop member 144 rigidly connected to the seat cushion 32. As illustrated in FIG. 14, the lug 142 and the first stop member 144 are positioned such that frontward pivotal movement of the idler ring 134 beyond its frontwardly tilted position is arrested by contact of lug 142 with first stop member 144. To clarify, the lug 142 and the first stop member 144 serve to ensure that frontward pivotal movement of the idler ring 134 cannot proceed past the frontwardly tilted position thereof; because, in turn, the control member 56 cannot pivot frontwardly past the catchment portion 76, the lug 142 and the first stop member 144 define the abutment means as previously described.

Figure 5:
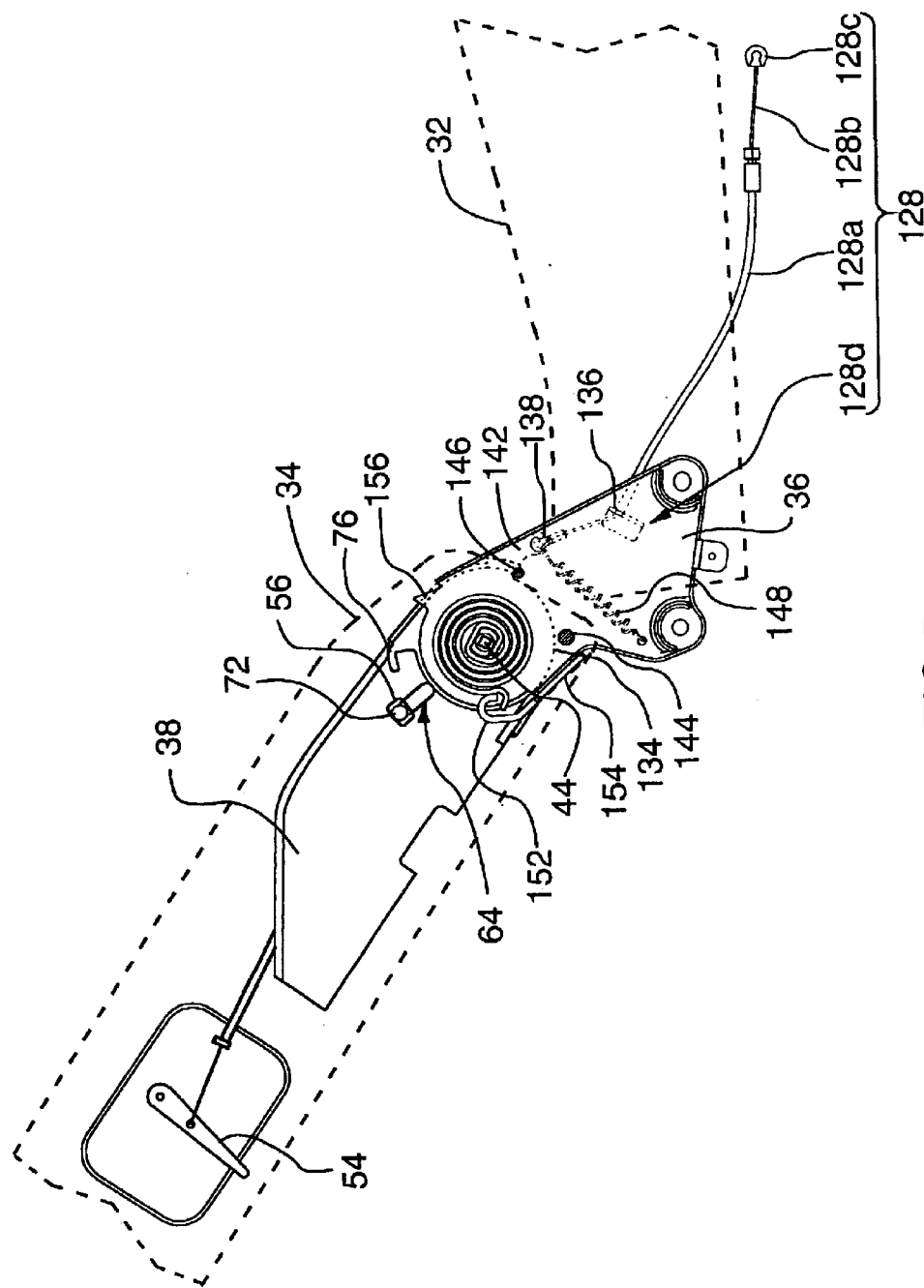
FIG. 5 is a view similar to FIG. 4, with the seat back disposed at a rearmost position thereof.

As other features of the preferred embodiment illustrated, the range of the seat back 34, in use, includes a rearmost position, shown in FIG. 5, which is relatively rearwardly pivotally displaced from the design position, and the idler ring 134 is rearwardly pivotable beyond its design position.

Figure 6:
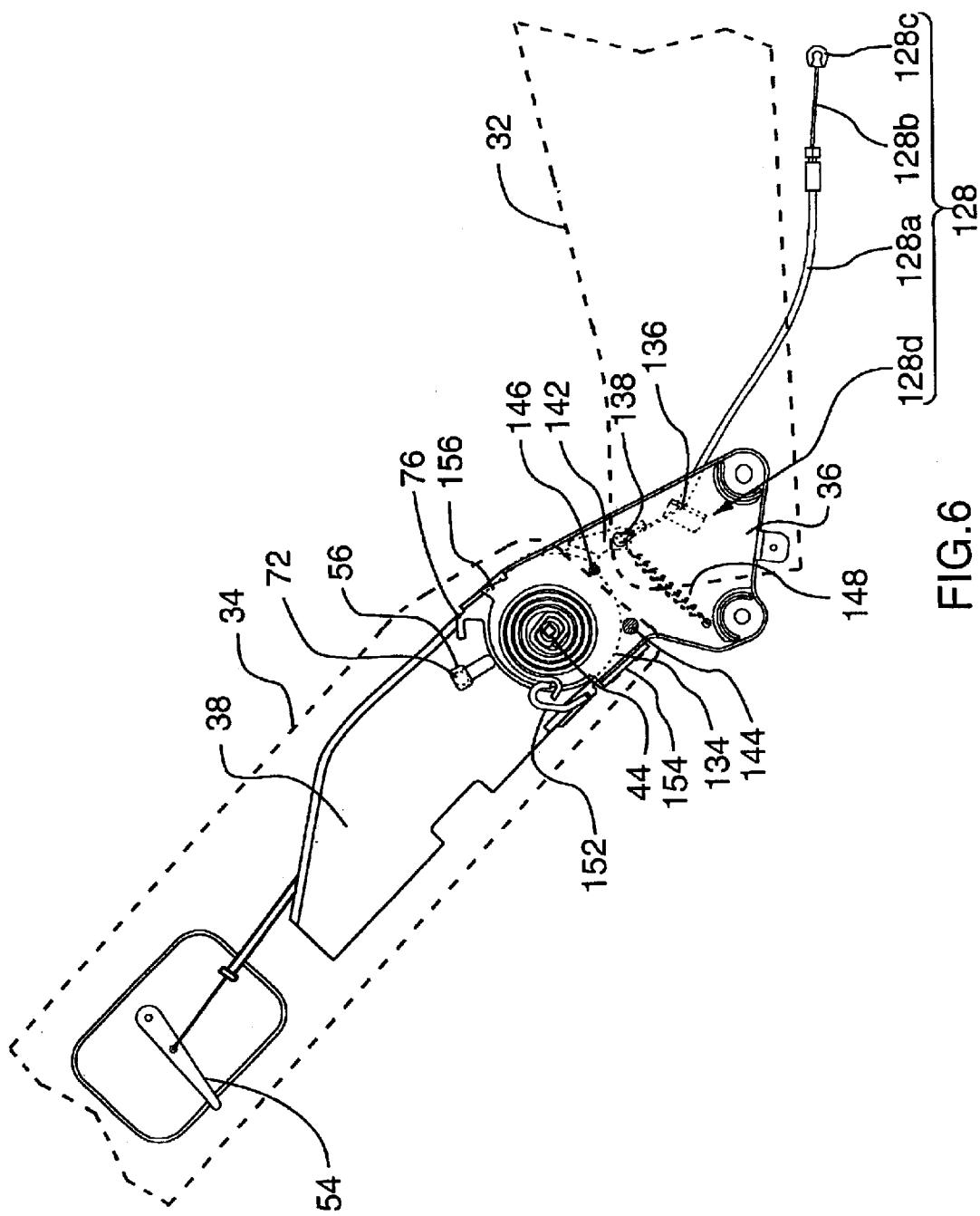
FIG. 6 is a view similar to FIG. 5, with the seat back pivoted frontwardly relative to its position in FIG. 5.
Figure 7:
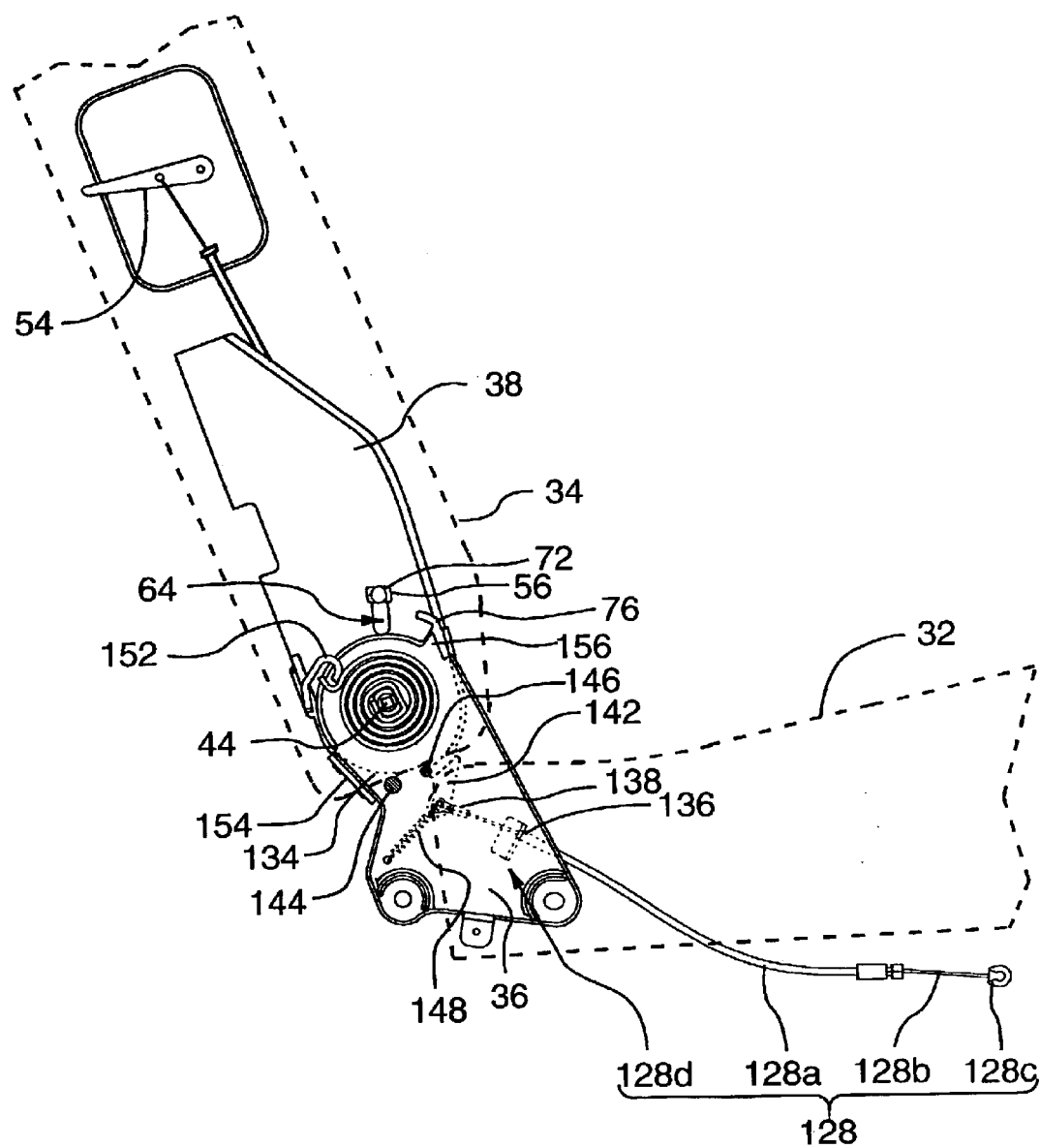
FIG. 7 is a view similar to FIG. 6, with the seat back pivoted frontwardly relative to its position in FIG. 6 and shown at a second transition position thereof.

As another such feature, a detent 146 is formed on the seat back mounting bracket 38. The detent 146 is positioned to contact the lug 142 when the idler ring 134 is at its design position and the seat back 34 is at its second transition position, and is adapted to bear against the lug 142 to drive the idler ring 134 pivotally rearwardly upon pivotal rearward movement of the seat back 34 beyond its second transition position, as indicated by the sequence of FIGS. 7, 6, 5.

As another preferred feature, a second spring 148 operably extends between the idler ring 134 and the seat cushion mounting bracket 36 for biasing the idler ring 134 for frontward pivotal movement towards its frontwardly tilted position.

The second spring 148 is sized and tensioned so as to be sufficient to effect frontward pivotal movement of the idler ring 134 to its design position upon frontward pivotal movement of seat back 34 to its second transition position and insufficient to apply, through the idler ring 134, said threshold tensile force to the actuator cable 128.

Thus, when the control member 56 is at its first position and the actuator cable 128 is at its first position, frontward pivotal movement of the seat back 34 is accompanied by contemporaneous frontward pivotal movement of the idler ring 134 until the seat back 34 reaches its second transition position, whereat further frontward pivotal movement of the idler ring 134, by means of said second spring 148, ceases, as indicated by the sequence of FIGS. 5–9. This selective movement of the idler ring 134, under control of the seat back 34 and through the agency of the second spring 148, detent 146, lug 142 and control cable 128 is advantageous since it provides for the catchment portion 76 to be disposed, at all positions of the seat back 34, in substantially laterally-spaced overlapped relation to the seat back 34, in which relation it is not susceptible to snag, for example, the clothing of an occupant.

As another preferred feature, the rearmost position of the seat back 34 is defined by a dog 152 and a rear stop member 154, the dog 152 being connected to the seat back 34 and the rear stop member 154 being rigidly connected to the seat cushion 32 and positioned such that rearward pivotal movement of seat back 34 beyond its rearmost position is arrested by contact of dog 152 with the rear stop member 154, as shown in FIG. 5.

As yet another such feature, a third spring 150 operably connects the seat back 34 to the seat cushion 32 to bias the seat back 34 for movement towards its frontmost position. The third spring 150 is sized and tensioned sufficiently to, when the control shaft 44 is at its disengaged position with the control member 56 at its second position and the actuator cable 128 at its first position, pivot the seat back 34 to its dumped position, with consequential movement of the idler ring 134 from its design position to its frontwardly tilted position and of the actuator cable 128 from its first position to its second position.

As illustrated in FIG. 18, the third spring 150 is a clock spring, and is connected to the seat back mounting bracket 38 by means of a curled end portion 149 adapted to engage the dog 152 and a central portion 151 adapted to engage a stud post 153 securely attached to the seat cushion mounting bracket 36.

Figure 9:
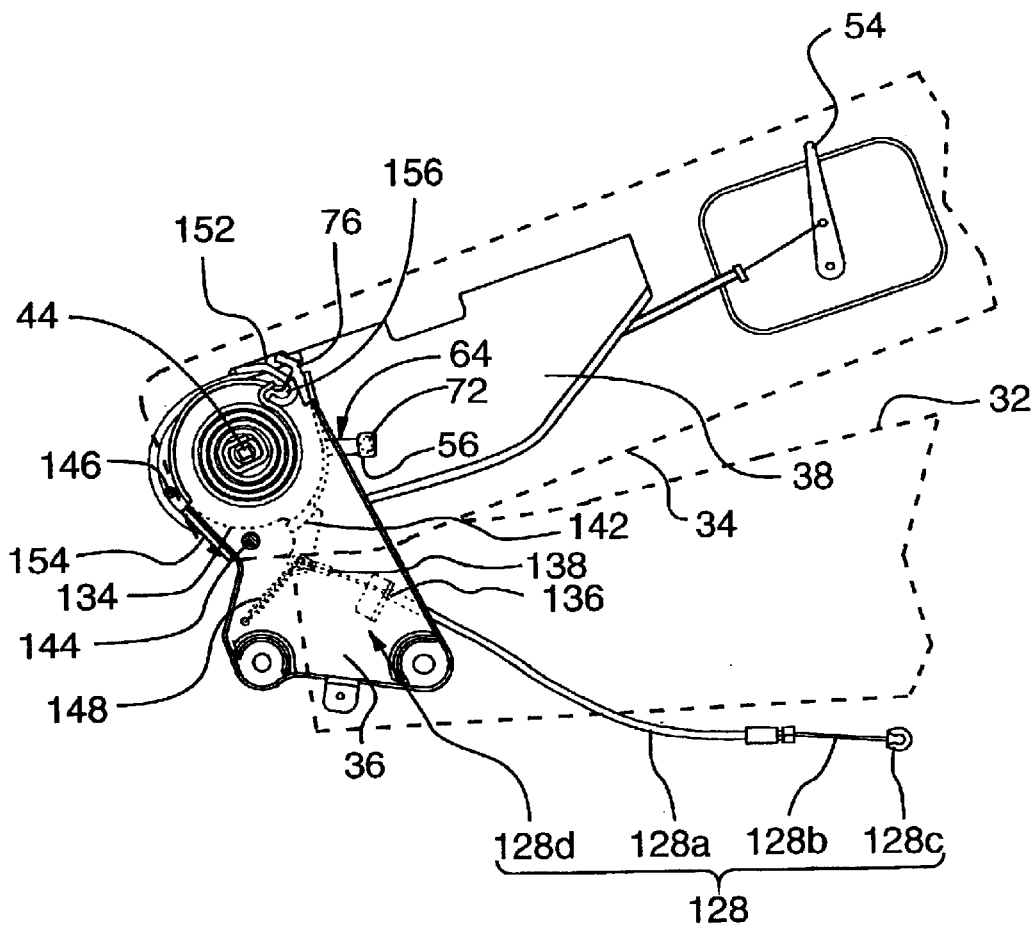
FIG. 9 is a view similar to FIG. 8, with the seat back disposed at a frontmost position thereof.

As another preferred feature, the frontmost position of the seat back 34 is defined by a front stop member 156, shown, inter alia, in FIG. 9. The front stop member 156 is rigidly connected to the seat cushion 32 and is positioned such that frontward pivotal movement of seat back 34 beyond its frontmost position is arrested by contact of dog 152 with the front stop member 156.

In operation, the tip activation handle 54 and the control shaft 44 will typically be disposed at their design and engaged positions, respectively, by bias provided by the internal components of the rotary recliner 40, in which positions, the seat back 34 will be locked at a position within the first range.

In order for a user to configure the seat back 34 at a desired position within the first range, he or she need only move the control shaft 44 to its disengaged position through manipulation of the recliner handle 100, whereupon the internal components of the rotary recliner 40 assume their unlocked configuration, so as to permit, as aforedescribed, relative rotation of the first portion 46 and the second portion 48. In such position, the occupant may manipulate the seat back 34 to said desired position, and then reinstate the control shaft 44 at its engaged position, again through the agency of the recliner handle 100, whereupon the internal components of the rotary recliner 40 are again configured to arrest said relative rotation of the first portion 46 and the second portion 48, locking the seat back 34 at said desired position.

If the initial position of the seat back 34 was an occupiable position, such manipulation of the seat back 34 can be effected by an occupant of the seat 30, with rearward pivotal movement of the seat back 34 being effected by pressure applied by the back of the occupant on the seat back 34, and frontward pivotal movement of the seat back 34 being effected by the third spring 150.

If the initial position of the seat back 34 was not occupiable, or if the user wishes to manipulate the seat back 34 towards a position wherein the seat 30 is not occupiable, for example, the frontmost position of the seat back 34, the user will typically stand to one side of the seat 30, and manipulate the recliner handle 100 with one hand and the seat back 34 with the other.

Figure 8:
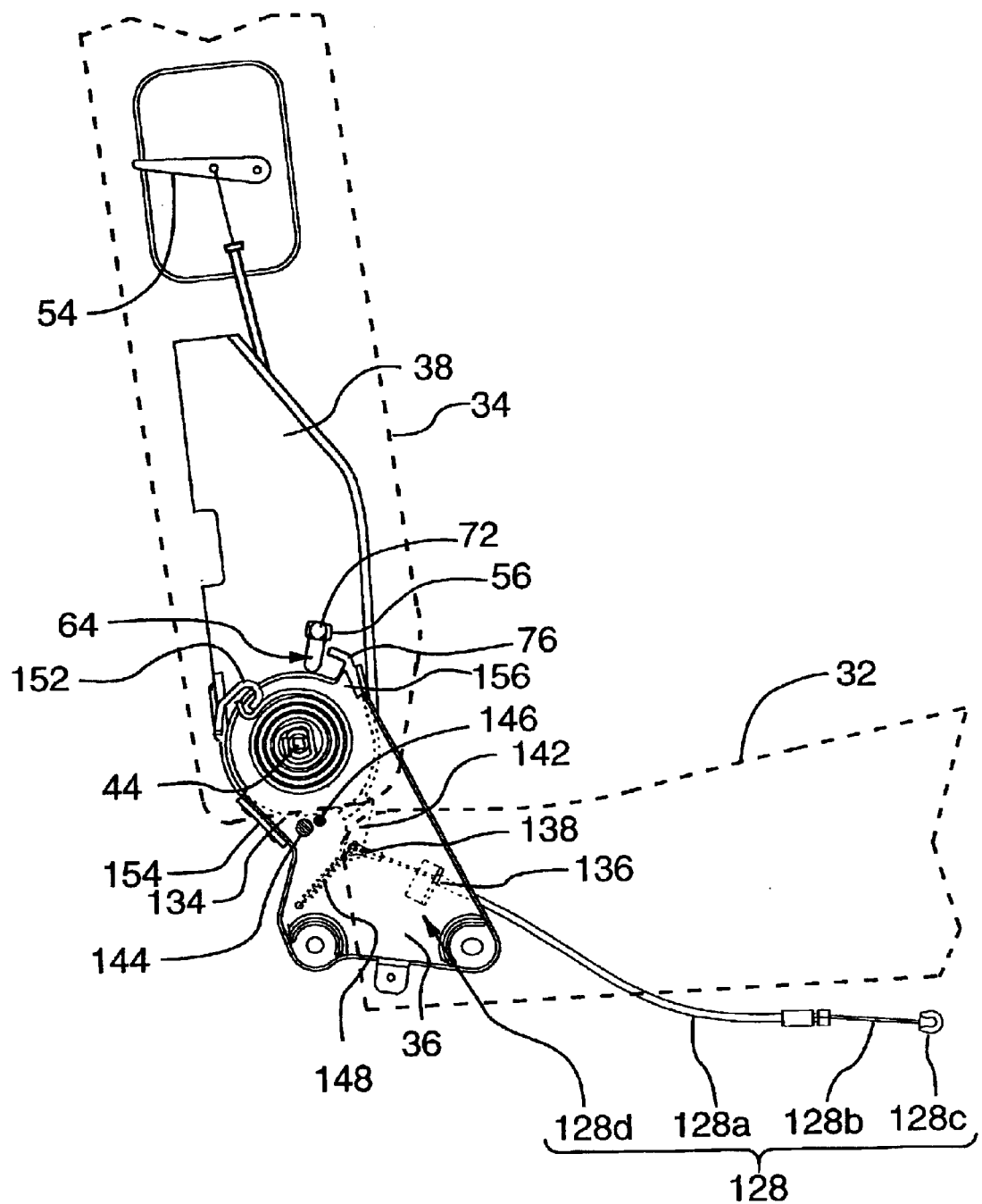
FIG. 8 is a view similar to FIG. 7, with the seat back pivoted frontwardly relative to its position in FIG. 7 and shown at a threshold position thereof.

From a threshold position of the seat back 34, shown in FIG. 8, or any position rearwardly disposed therefrom, an operator can selectively release the seat back 34 for movement to its dumped position simply by manually manipulating the tip activation handle 54 to its tipping position. Such manipulation of the tip activation handle 54, as described more fully in previously paragraphs, causes staged movement: in a first stage, movement of the tip activation handle 54 from the design position to the intermediate position thereof causes the control member 56 to be drawn to its second position, so as to be in position for engagement with the catchment portion 76, as shown by the sequence of FIGS. 10, 11: in a second stage, movement of the tip activation handle 54 from its intermediate position to its tipping position causes the control shaft 44 to be moved to its disengaged position, as shown by the sequence of FIGS. 11,12, thus permitting movement of the seat back 34 about the pivot axis A—A, whereupon the seat back 34 is urged frontwardly, through the agency of the third spring 150. Such frontward pivotal movement of the seat back 34 will be accompanied by frontward pivotal movement of the idler ring 134 until such time as seat back 34 reaches its second transition position shown in FIG. 7. From the second transition position, frontward pivotal movement of the seat back 34 continues without contemporaneous pivotal movement of the idler ring 134 until such time as the seat back 34 reaches its first transition position, as shown in FIG. 13. At this point, the control member 56 engages the catchment portion 76, whereupon contemporaneous pivotal movement of the seat back 34 and the idler ring 134 occurs until the seat back 34 reaches the dumped position, as shown in FIG. 14, whereat the lug 142 engages the first stop member 144 to arrest further movement. At this point, the tip activation handle 54 may be released to its design position to lock the seat back 34 in position.

In order to return seat back 34 to a position wherein the seat 30 is occupiable, an operator, standing to the side of the seat 30, may effect rotation of the control shaft 44 to the disengaged position through recliner handle 100 or through manipulation of the tip activation handle 54 to its tipping position, and manually manipulate the seat back 34 rearwardly, to an occupiable position, whereupon the recliner handle 100 or the tip activation handle 54, as the case may be, can be released, to lock the seat back 34 in position.

In positions of the seat back 34 relatively frontwardly displaced from the threshold position of the seat back 34 shown in FIG. 8, manipulation by an operator of the tip activation handle 54 to its tipping position will serve to cause the control member 56 to move towards its second position until such time as it contacts the idler ring 134, whereupon movement of the control shaft 44 to its disengaged position will occur. However, because the control member 56 is not in position for driving engagement with the catchment portion 76, movement of the control shaft 44 to its disengaged position will permit third spring 150 to urge the seat back 34 to its frontmost position. To avoid the potential for inadvertent release, the seat back 34 is arranged to be substantially upright at its threshold position such that, at the threshold position of the seat back 34, the seat 30 is occupiable but substantially uncomfortable, such that occupants would typically not assume this position for normal occupation, and indeed, would only assume this position as a precursor to a subsequent operation whereby the seat back 34 is brought to its frontmost position.

Various modifications and alterations may be used in the design and manufacture of the seat assembly without departing from the spirit and scope of the invention.

For example, whereas a particular type of rotary recliner is identified and illustrated herein, other types of known rotary recliners have utility in this application.

Further, whereas a specific type of track assembly and carriage lock means is herein described and illustrated, it will be understood that other known track and carriage lock assemblies may be used within the scope of the invention.

As well, whereas in the preferred embodiment illustrated, the seat back mounting bracket and the seat cushion mounting bracket of the second hinge are pivotally mounted to one another without the intervening use of a rotary recliner, it would be possible, indeed desirable, in certain seating applications to do so, in which case a slave tube would operatively connect the two analogously installed rotary recliners, for contemporaneous activation thereof.

Additionally, whereas a recliner handle is provided in the preferred embodiment, to facilitate movement of the control shaft between its engaged position and its disengaged position, it will be evident that other mechanisms, such as, for example, a rotary knob, could be utilized, with the same result.

As well, it will be evident that mechanisms other than the combination of locating studs, corresponding holes and spot welding could be utilized to provide for mounting of the seat cushion mounting bracket and the seat back mounting bracket to the rotary recliner.

As well, whereas in the preferred embodiment, the frontmost position of the seat back is a fold-flat position, whereat the seat back overlies the seat cushion in a generally horizontal orientation, it will be understood that the frontmost position of the seat back need not be substantially horizontal.

As well, whereas in the preferred embodiment illustrated, the abutment means comprises a first stop member and a lug formed on the idler ring, it will be understood that other abutment means could be utilized. For example, in circumstances wherein E-Z entry functionality was not desired, the idler ring could be eliminated, in which case, a catchment portion formed directly on the seat cushion mounting bracket could serve as the abutment means.

Of course, while a right-handed application of the invention, only, is shown, that is, an application wherein the recliner handle and tip activation handle are disposed on the right side of the seat (particularly advantageous for a vehicle passenger seat), it will be understood that the invention can equally be deployed in a left-handed application (particularly advantageous for a vehicle driver seat).

Additionally, whereas in the preferred embodiment, the frontmost position and the rearmost position of the seat back are defined by interference between lugs and various stop members, it should be understood that the frontmost and rearmost positions could as easily be defined by interference with the seat back and the floor of the vehicle, or otherwise.

Accordingly, it will be understood that the scope of the present invention is limited only by the following claims, purposively construed.

We claim:

1. An improved vehicle seat assembly for use in a vehicle of the type having a front end, a rear end, a longitudinal axis extending between the front end and the rear end, a lateral axis arranged transverse to the longitudinal axis and a floor, said vehicle seat assembly being of the type having a seat, said seat including:
   a seat cushion having a seat cushion mounting bracket, said seat cushion, in use, being operatively mounted on said floor;
   a seat back having a seat back mounting bracket;
   a rotary recliner comprising:
      a first portion securely attached to said seat cushion mounting bracket and defining a pivot axis, said pivot axis, in use, extending in a substantially lateral manner and being disposed adjacent the rear end of the seat cushion; and
      a second portion mounted to the first portion for selective relative pivotal movement about said pivot axis and having the seat back mounting bracket securely attached thereto so as to provide, in use, for selective pivotal movement of the seat back with respect to the seat cushion about said pivot axis within a first range of angular positions including
      a second range of positions whereat the seat is occupiable, said second range including a design position,
         a dumped position relatively frontwardly pivotally displaced from the second range; and
         a frontmost position, relatively frontwardly pivotally displaced from the dumped position,
   wherein the improvement comprises:
   a tip activation handle mounted on the seat back for movement between a design position, a tipping position and an intermediate position therebetween;
   a control member;
   mounting means for mounting the control member on the seat back mounting bracket for pivotal movement therewith about the pivot axis and for constrained substantially radial relative movement between a first position and a second position;
   abutment means for selectively, when the control member is at its second position and the seat back is at its dumped position, engaging the control member to arrest frontward pivotal movement of the control member, thereby to arrest frontward pivotal movement of the seat back about the pivot axis at the dumped position thereof when the control member is at its second position; and
   first linkage means for
      selectively effecting movement of the control member between its first position and its second position upon movement of the tip activation handle between its design position and its intermediate position; and
      controlling the rotary recliner to permit said relative pivotal movement of the first portion and the second portion upon movement of the tip activation handle to its tipping position,
   thereby to provide, when the seat back is within the second range and upon manual manipulation of the tip activation handle from its design position to its tipping position, for said first linkage means to control said rotary recliner to permit said relative pivotal movement of the first portion and the second portion only after the control member has reached its second position, so as to ensure that frontward pivotal movement of the seat back about the pivot axis beyond the dumped position thereof is arrested by the abutment means.

2. A seat assembly according to claim 1, further comprising a control shaft mounted to the rotary recliner for pivotal movement about the pivot axis between a disengaged position and an engaged position, the control shaft being biased for movement towards its engaged position and operably coupled to the rotary recliner such that said relative pivotal movement of the first portion and the second portion is permitted when the control shaft is at its disengaged position and is arrested when the control shaft is at its engaged position.

3. A seat assembly according to claim 2, further comprising a handle rigidly mounted to the control shaft for manual manipulation of the control shaft between its engaged position and its disengaged position.

4. A seat assembly according to claim 1, wherein the mounting means comprises:
   a radial slot formed through the seat back mounting bracket and defining a translation axis; and
   a link member having a first end mounted to the seat back mounting bracket by a pin and socket mechanism and a second end mounted within said radial slot for translational movement along said translation axis between limit positions defined by the ends of said radial slot,
   the second end of said link member being connected to said control member to drive the control member between its first position and its second position upon movement of the second end of the link member between its limit positions.

5. A seat assembly according to claim 4, wherein the control shaft forms the pin of the pin and socket mechanism.

6. A seat assembly according to claim 4, wherein the first linkage means comprises:
   a first spring operably connected between the seat back mounting bracket and the link member for biasing the control member for movement towards its first position;
   a crank rigidly extending from the control shaft, in a radial direction substantially transverse to said translation axis, to a free end; and
   a first Bowden cable having the opposed ends of its inner wire operably connected to the tip activation handle and to the free end of the crank and the opposed ends of its sheath operably connected to the seat back and to the link member such that, when the tip activation handle is at its design position with the control member at its first position and the control shaft at its engaged position, movement of the tip activation handle from its design position to its intermediate position causes movement of the control member to its second position and such that, when the control member is at its second position with the control shaft at its engaged position and the tip activation handle at its intermediate position, movement of the tip actuation handle to its tipping position causes rotation of the control shaft to its disengaged position.

7. A seat assembly according to claim 1, further comprising a seat carriage, wherein, in use, the seat carriage is operatively mounted on the floor for relative longitudinal movement through a plurality of longitudinal positions and wherein the seat cushion is mounted on said seat carriage for longitudinal movement therewith.

8. A seat assembly according to claim 7, further comprising carriage lock means for selectively permitting said longitudinal movement of the seat carriage, said carriage lock means including an actuator cable having a first position, whereat said longitudinal movement of the seat carriage is arrested, and a second position, whereat said longitudinal movement of the seat carriage is permitted, wherein the actuator cable can be drawn from its first position to its second position only upon application thereto of at least a threshold tensile force.

9. A seat assembly according to claim 8,
   wherein the first range of angular positions includes a first transition position, relatively frontwardly pivotally displaced from the second range of occupiable positions; and
   further comprising second linkage means for drawing the actuator cable from its first position to its second position, when the control member is at its second position and upon frontward pivotal movement of the seat back from its first transition position to its dumped position.

10. A seat assembly according to claim 9, further comprising an idler ring mounted to the seat cushion mounting bracket for relative pivotal movement, in use, about the pivot axis between a design position and a frontwardly tilted position, the idler ring having the actuator cable operably attached thereto such that, during said pivotal movement of the idler ring from its design position to its frontwardly tilted position, the actuator cable is drawn from its first position to its second position.

11. A seat assembly according to claim 10, wherein the second linkage means comprises a catchment portion formed on said idler ring, the catchment portion being shaped and positioned such that, when the control member is at its second position and upon pivotal movement of the seat back from its first transition position to its dumped position, the control member contacts the catchment portion to drive the idler ring from its design position to its frontwardly tilted position.

12. A seat assembly according to claim 11, wherein the abutment means comprises a protruding lug formed on the idler ring and a first stop member rigidly connected to the seat cushion, the lug and the first stop member being positioned such that frontward pivotal movement of the idler ring beyond its frontwardly tilted position is arrested by contact of the lug with the first stop member.

13. A seat assembly according to claim 12, wherein the range of the seat back, in use, includes a rearmost position, relatively rearwardly pivotally displaced from the design position, and wherein the idler ring is rearwardly pivotable beyond its design position.

14. A seat assembly according to claim 13,
   wherein the first range of angular positions includes a second transition position, relatively rearwardly pivotally disposed from the first transition position; and
   further comprising a detent formed on the seat back mounting bracket, the detent being positioned to contact the lug when the idler ring is at its design position and the seat back is at its second transition position, and being adapted to bear against the lug to drive the idler ring pivotally rearwardly upon pivotal rearward movement of the seat back beyond its second transition position.

15. A seat assembly according to claim 14, further comprising a second spring operably extending between the idler ring and the seat cushion mounting bracket for biasing the idler ring for frontward pivotal movement towards its frontwardly tilted position,
   the second spring being sized and tensioned so as to be sufficient to effect frontward pivotal movement of the idler ring to its design position upon frontward pivotal movement of the seat back to its second transition position and insufficient to apply, through the idler ring, said threshold tensile force to the actuator cable, such that, when the control member is at its first position and the actuator cable is at its first position, frontward pivotal movement of the seat back is accompanied by contemporaneous frontward pivotal movement of the idler ring until the seat back reaches its second transition position, whereat further frontward pivotal movement of the idler ring, by means of said second spring, ceases.

16. A seat assembly according to claim 15, further comprising a third spring operably connected between the seat back and the seat cushion to bias the seat back for movement towards its frontmost position, the third spring being sized and tensioned sufficiently to, when the control shaft is at its disengaged position with the control member at its second position and the actuator cable at its first position, pivot the seat back to its dumped positions with consequential movement of the idler ring from its design position to its frontwardly tilted position and of the actuator cable from its first position to its second position.

17. A seat assembly according to claim 16, further comprising a dog connected to the seat back and a rear stop member rigidly connected to the seat cushion, the dog end the rear stop member being positioned such that rearward pivotal movement of the seat back beyond its rearmost position is arrested by contact of the dog with the rear stop member.

18. A seat assembly according to claim 17, further comprising a front stop member rigidly connected to the seat cushion, the front stop member being positioned such that frontward pivotal movement of the seat back beyond its frontmost position is arrested by contact of the dog with the front stop member.

19. A hinge mechanism for use in a seat assembly for a vehicle of the type having a front end, a rear end, a longitudinal axis extending between the front end and the rear end, a lateral axis arranged transverse to the longitudinal axis and a floor, said hinge mechanism being of the type having:

a seat cushion mounting bracket, said seat cushion mounting bracket, in use, forming part of a vehicle seat cushion and being operatively mounted on said floor;

a seat back mounting bracket, said seat back mounting bracket, in use, forming part of a vehicle seat back;

a rotary recliner comprising:
  a first portion securely attached to said seat cushion mounting bracket and defining a pivot axis, said pivot axis, in use, extending in a substantially lateral manner and being disposed adjacent the rear end of said seat cushion; and
  a second portion mounted to the first portion for selective relative pivotal movement about said pivot axis and having the seat back mounting bracket securely attached thereto so as to provide, in use, for selective pivotal movement of said seat back with respect to the seat cushion about said pivot axis within a first range of angular positions, said first range including
  a second range of positions whereat said seat cushion and seat back form an occupiable seat, said second range including a design position,
  a dumped position relatively frontwardly pivotally displaced from the second range,
  a frontmost position, relatively frontwardly pivotally displaced from the dumped position, a control shaft mounted to the rotary recliner for pivotal movement about the pivot axis between a disengaged position and an engaged position, the control shaft being biased for movement towards its engaged position and operably coupled to the rotary recliner such that said relative pivotal movement of the first portion and the second portion is permitted when the control shaft is at its disengaged position and is arrested when the control shaft is at its engaged position, wherein the improvement comprises:

a tip activation handle mountable on said seat back for movement between a design position, a tipping position and an intermediate position therebetween;

a control member;

mounting means for mounting the control member on the seat back mounting bracket for pivotal movement therewith about the pivot axis in use and for constrained substantially radial relative movement between a first position and a second position, said mounting means comprising: a radial slot formed through the seat back mounting bracket and defining a translation axis; and a link member having a first end mounted to the seat back mounting bracket by a pin and socket mechanism and a second end mounted within said radial slot for translational movement along said translation axis between limit positions defined by the ends of said radial slot, the second end of said link member being connected to said control member to drive the control member between its first position and its second position upon movement of the second end of the link member between its limit positions, abutment means for selectively, when the control member is at its second position and said seat back is at its dumped position, engaging the control member to arrest frontward pivotal movement of the control member about the pivot axis, thereby to arrest frontward pivotal movement of the seat back about the pivot axis at the dumped position thereof when the control member is at its second position; and first linkage means for selectively effecting movement of the control member between its first position and its second position upon movement of the tip activation handle between its design position and its intermediate position and for controlling the rotary recliner to permit said relative pivotal movement of the first portion and the second portion upon movement of the tip activation handle to its tipping position, said first linkage means comprising:
  a first spring operably connected between the seat back mounting bracket and the link member for biasing the control member for movement towards its first position;
  a crank rigidly extending from the control shaft, in a radial direction substantially transverse to said translation axis, to a free end; and
  a first Bowden cable, said first Bowden cable, in use, having the opposed ends of its inner wire operably connected to the tip activation handle and to the free end of the crank and the opposed ends of its sheath operably connected to said seat back and to the link member such that, when the tip activation handle is at its design position with the control member at its first position and the control shaft at its engaged position, movement of the tip activation handle from its design position to its intermediate position causes movement of the control member to its second position and such that, when the control member is at its second position with the control shaft at its engaged position and the tip activation handle at its intermediate position, movement of the tip actuation handle to its tipping position causes rotation of the control shaft to its disengaged position, thereby to provide, when the seat back is within the second range and upon manual manipulation of the tip activation handle from its design position to its tipping position, for said first linkage means to control said rotary recliner to permit said relative pivotal movement of the first portion and the second portion only after the control member has reached its second position, so as to ensure that frontward pivotal movement of said seat back about the pivot axis beyond the dumped position is arrested by the abutment means.

* * * * *